US008812944B2

(12) United States Patent
Faris et al.

(10) Patent No.: US 8,812,944 B2
(45) Date of Patent: Aug. 19, 2014

(54) PAGE MODULES AND PROVIDING CONTENT

(75) Inventors: Andrew Boath Faris, Venice, CA (US); Anthony Dominic Amidei, Santa Monica, CA (US); Stephen Gerald Garcia, Santa Monica, CA (US); Joshua Allen Rehling, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 899 days.

(21) Appl. No.: 11/840,168

(22) Filed: Aug. 16, 2007

(65) Prior Publication Data
US 2009/0049370 A1   Feb. 19, 2009

(51) Int. Cl.
*G06F 17/00*   (2006.01)

(52) U.S. Cl.
USPC ............ 715/200; 715/205; 715/747; 715/762

(58) Field of Classification Search
USPC .................................. 715/200, 205, 762, 747
See application file for complete search history.

(56) References Cited

U.S. PATENT DOCUMENTS

| | | | |
|---|---|---|---|
| 5,230,072 A * | 7/1993 | Smith et al. ........................... | 1/1 |
| 6,278,449 B1 | 8/2001 | Sugiarto et al. | |
| 6,745,238 B1 | 6/2004 | Giljum et al. | |
| 6,832,355 B1 * | 12/2004 | Duperrouzel et al. ........ | 715/788 |
| 6,918,090 B2 | 7/2005 | Hesmer et al. | |
| 7,062,511 B1 | 6/2006 | Poulsen | |
| 7,149,982 B1 * | 12/2006 | Duperrouzel et al. ........ | 715/788 |
| 7,310,677 B1 | 12/2007 | Cohen et al. | |
| 7,367,014 B2 | 4/2008 | Griffin | |
| 7,430,722 B2 | 9/2008 | Martin et al. | |
| 7,548,957 B1 | 6/2009 | Wichmann et al. | |
| 7,661,061 B2 | 2/2010 | Joshi | |
| 7,689,682 B1 | 3/2010 | Eldering et al. | |
| 2002/0075330 A1 | 6/2002 | Rosenzweig et al. | |
| 2002/0103689 A1 | 8/2002 | Hornick et al. | |
| 2002/0122066 A1* | 9/2002 | Bates et al. ................... | 345/786 |
| 2002/0169852 A1 | 11/2002 | Schaeck | |
| 2003/0117437 A1 | 6/2003 | Cook et al. | |

(Continued)

FOREIGN PATENT DOCUMENTS

KR   10-1999-0084142 A   12/1999
KR   10-2000-0040497 A   7/2000

OTHER PUBLICATIONS

U.S. Appl. No. 11/840,146, filed Aug. 16, 2007, Garcia et al.
U.S. Appl. No. 11/840,180, filed Aug. 16, 2007, Rehling et al.

(Continued)

*Primary Examiner* — Stephen Hong
*Assistant Examiner* — Marshon Robinson
(74) *Attorney, Agent, or Firm* — Brinks Gilson & Lione

(57) ABSTRACT

A method of providing content to a user uses a browser, connects to a server; and performs a check. The method provides a set of modules, and thereby forms a page of modules. The method customizes a first module in the set of modules, saves the customization, and executes a function provided by a module in the set of modules. Initially, the set of modules may include a default set of modules, which includes the first module and a second module. The first module may assume several shapes, and content presented by the first module automatically adjusts according to the shape of the first module to maximize a field of view of the content for the user. Preferably, the first and second modules are stacked such that a horizontal dimension of the first and second modules spans the width of a browser window.

31 Claims, 29 Drawing Sheets

(56) References Cited

U.S. PATENT DOCUMENTS

| | | | |
|---|---|---|---|
| 2003/0145275 A1* | 7/2003 | Qian et al. | 715/500 |
| 2003/0167315 A1* | 9/2003 | Chowdhry et al. | 709/218 |
| 2004/0003097 A1 | 1/2004 | Willis et al. | |
| 2004/0010598 A1 | 1/2004 | Bales et al. | |
| 2004/0030795 A1* | 2/2004 | Hesmer et al. | 709/231 |
| 2004/0148307 A1 | 7/2004 | Rempell | |
| 2004/0183831 A1 | 9/2004 | Ritchy et al. | |
| 2004/0261032 A1 | 12/2004 | Olander et al. | |
| 2005/0034056 A1* | 2/2005 | Rubin et al. | 715/500 |
| 2005/0055632 A1* | 3/2005 | Schwartz et al. | 715/513 |
| 2005/0065913 A1 | 3/2005 | Lillie et al. | |
| 2005/0084152 A1 | 4/2005 | McPeake | |
| 2005/0097190 A1 | 5/2005 | Abdelhak | |
| 2005/0223081 A1 | 10/2005 | McMahan et al. | |
| 2005/0257128 A1* | 11/2005 | Pasquali et al. | 715/500 |
| 2006/0026557 A1 | 2/2006 | Petri | |
| 2006/0031849 A1 | 2/2006 | Barta et al. | |
| 2006/0070002 A1 | 3/2006 | Guido et al. | |
| 2006/0085741 A1* | 4/2006 | Weiner et al. | 715/517 |
| 2006/0161672 A1* | 7/2006 | Jolley et al. | 709/230 |
| 2006/0168541 A1 | 7/2006 | Hill et al. | |
| 2006/0184882 A1 | 8/2006 | Molander | |
| 2006/0224951 A1* | 10/2006 | Burke et al. | 715/513 |
| 2006/0249567 A1 | 11/2006 | Byrne et al. | |
| 2006/0282822 A1 | 12/2006 | Weng | |
| 2007/0006083 A1 | 1/2007 | Daniels et al. | |
| 2007/0016857 A1 | 1/2007 | Polleck | |
| 2007/0067331 A1* | 3/2007 | Schachter et al. | 707/102 |
| 2007/0073701 A1 | 3/2007 | Miller | |
| 2007/0089053 A1 | 4/2007 | Uhlig et al. | |
| 2007/0124460 A1 | 5/2007 | McMullen | |
| 2007/0150368 A1 | 6/2007 | Arora et al. | |
| 2007/0156594 A1 | 7/2007 | McGucken | |
| 2007/0208751 A1 | 9/2007 | Cowan et al. | |
| 2007/0209011 A1 | 9/2007 | Padmanabhuni et al. | |
| 2007/0283243 A1 | 12/2007 | Beiser et al. | |
| 2007/0288855 A1* | 12/2007 | Rohrabaugh et al. | 715/760 |
| 2008/0016116 A1 | 1/2008 | Tarr | |
| 2008/0040672 A1 | 2/2008 | Appleyard et al. | |
| 2008/0046327 A1 | 2/2008 | Schnietz | |
| 2008/0052147 A1 | 2/2008 | Reshef et al. | |
| 2008/0071929 A1 | 3/2008 | Motte et al. | |
| 2008/0077595 A1 | 3/2008 | Leebow | |
| 2008/0172372 A1* | 7/2008 | Shacham et al. | 707/5 |
| 2008/0192908 A1* | 8/2008 | O'Keefe et al. | 379/93.17 |
| 2008/0201408 A1 | 8/2008 | Behara et al. | |
| 2008/0301237 A1 | 12/2008 | Parsons et al. | |
| 2009/0007061 A1 | 1/2009 | Ben-Zvi et al. | |

OTHER PUBLICATIONS

Written Opinion of the International Searching Authority for Related Foreign Application PCT/US2008/070773.
International Search Report for Related Foreign Application PCT/US2008/070773.
U.S. Appl. No. 11/840,180, filed Aug. 16, 2007, Rehling, Office Action dated Sep. 1, 2011.
U.S. Appl. No. 11/840,146, filed Aug. 16, 2007, Garcia, Office Action dated Sep. 6, 2011.

* cited by examiner

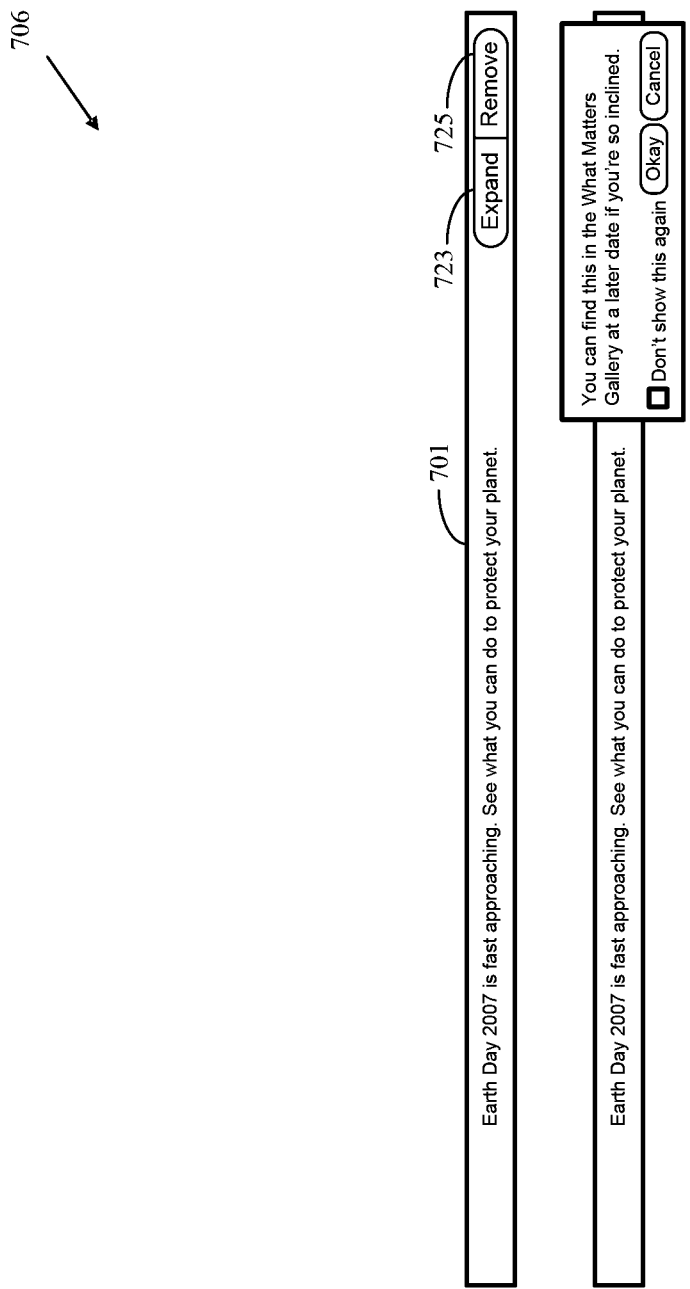

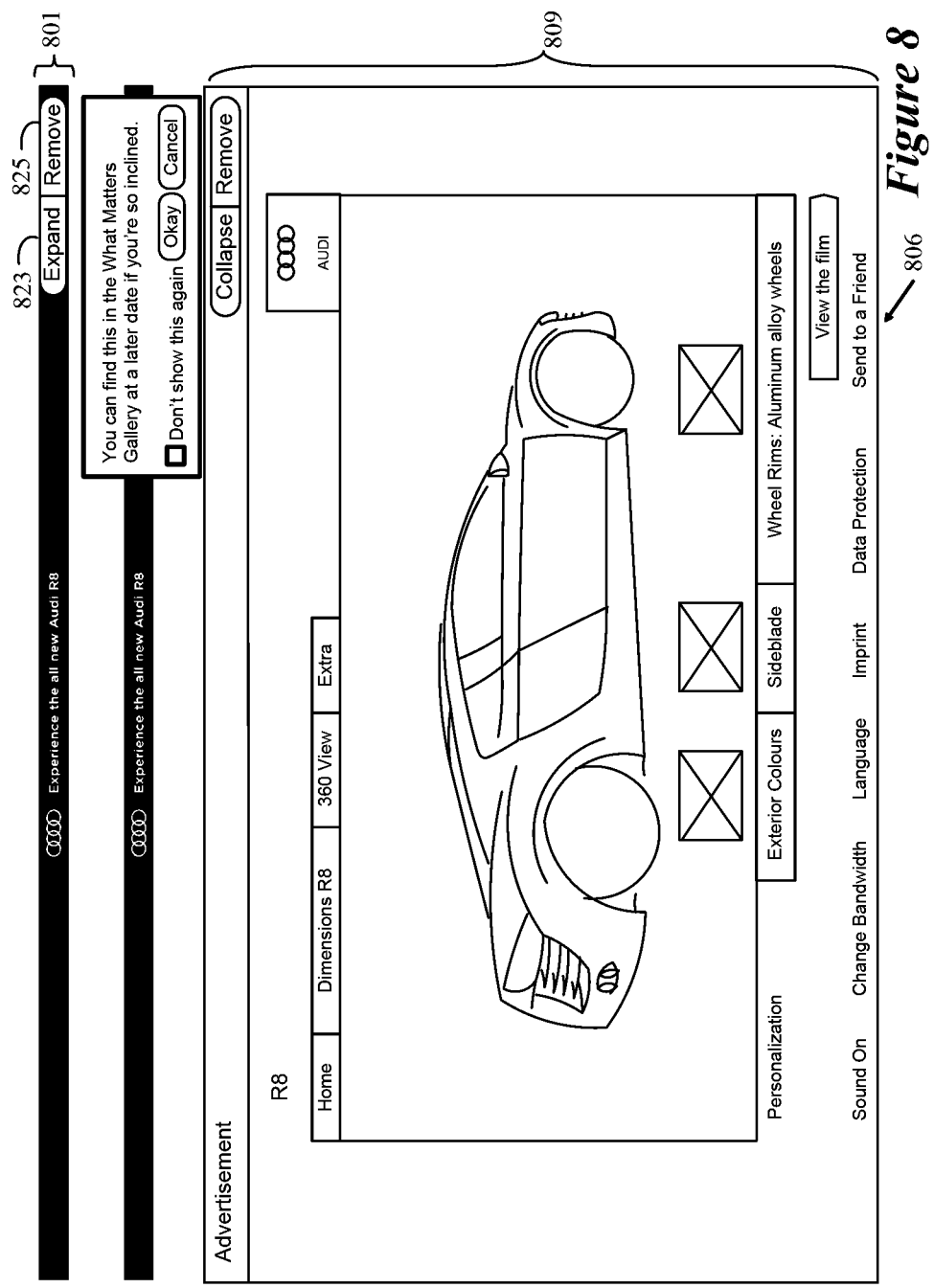

Figure 9B

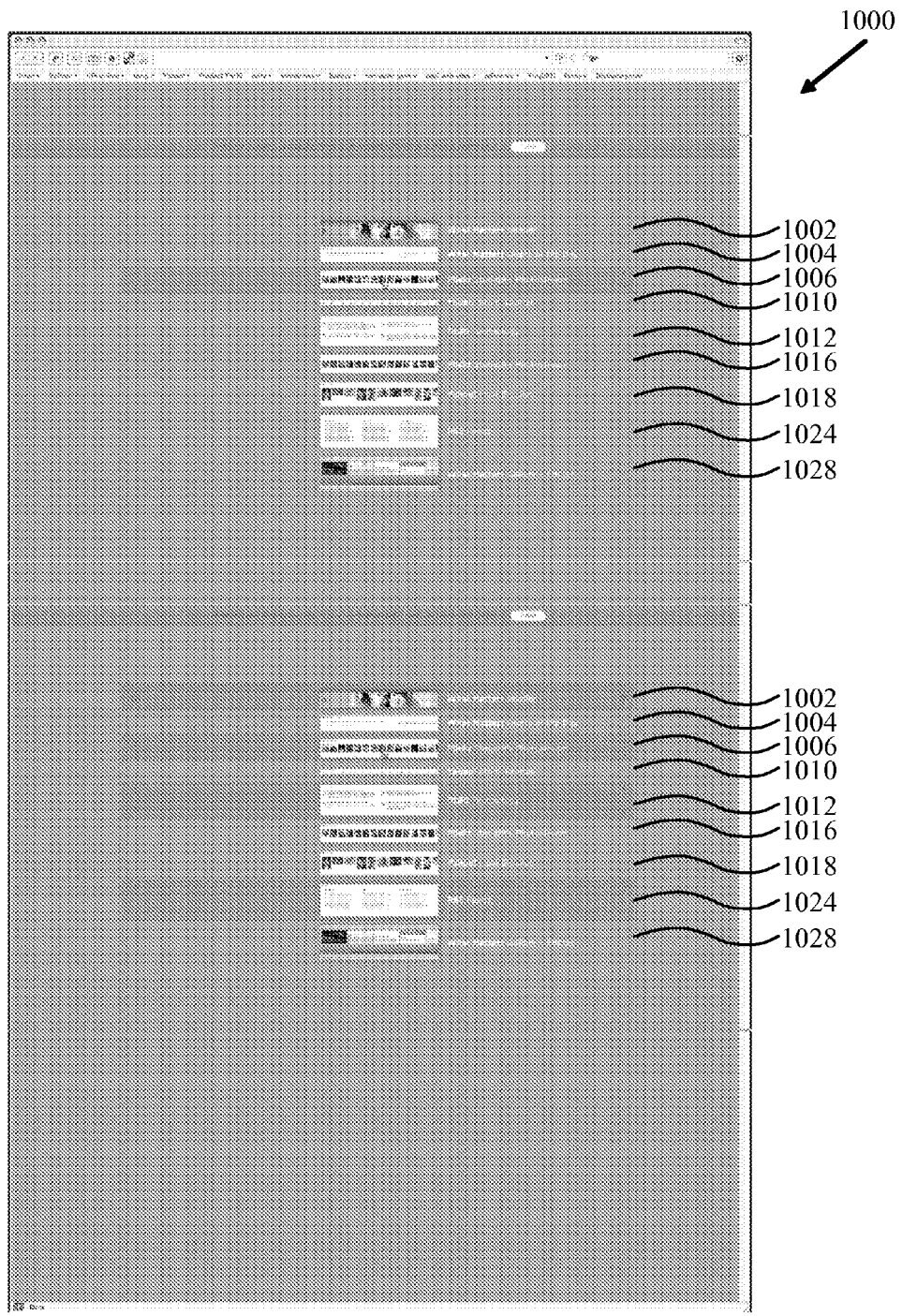
*Figure 10* (Whole View)

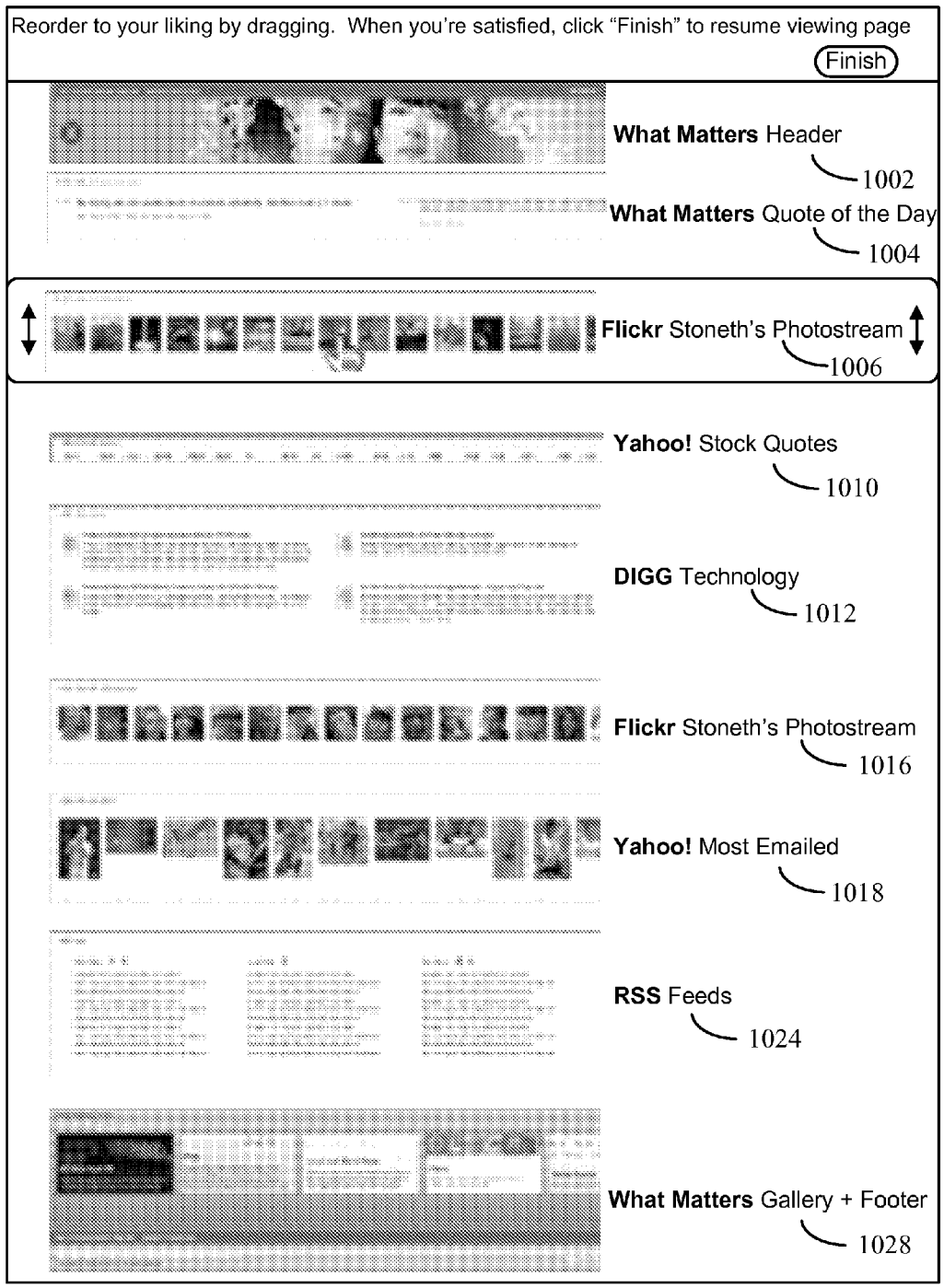
*Figure 10A* (Enlarged View)

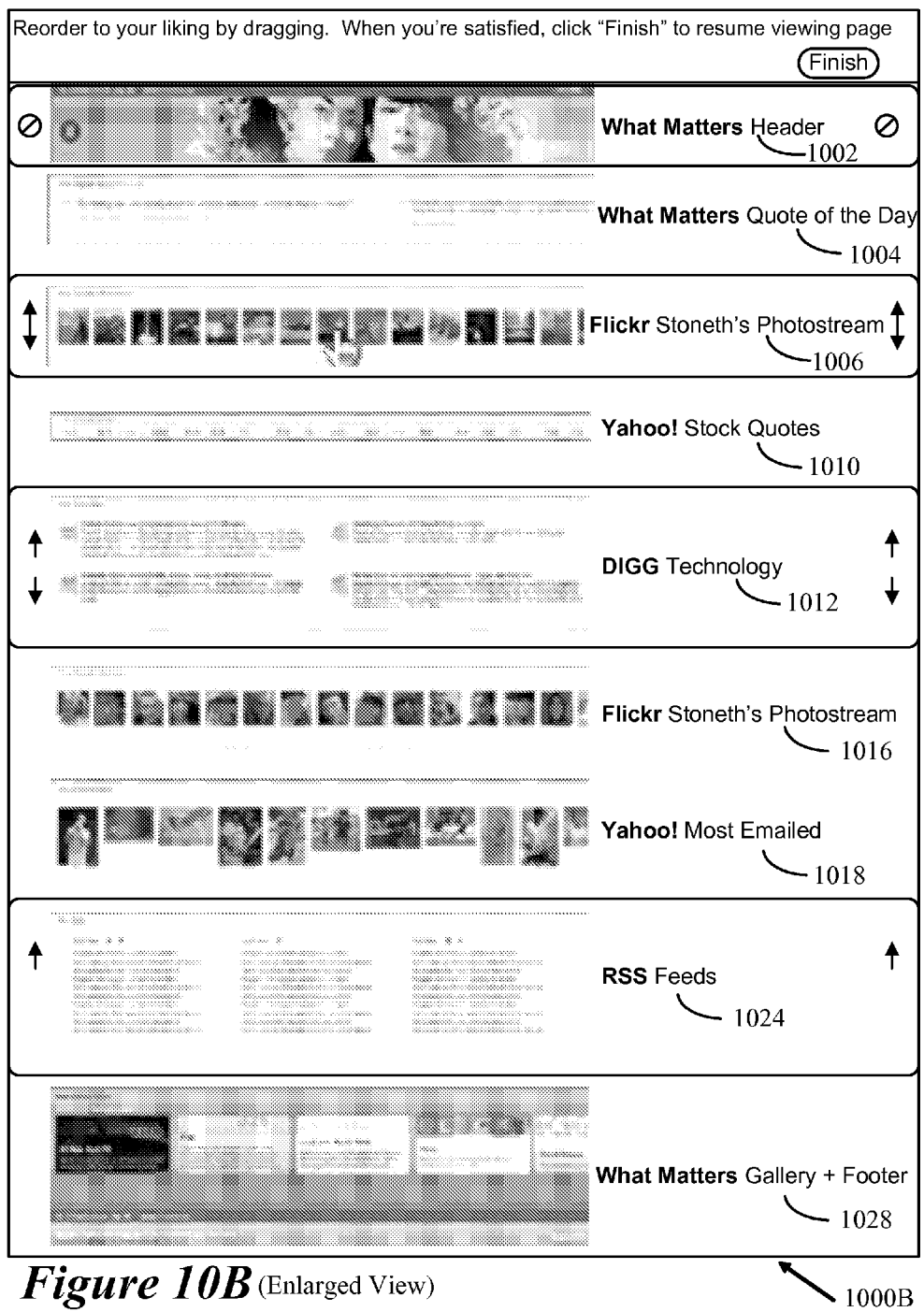
Figure 10B (Enlarged View)

| What Matters Quote of the Day | | |
|---|---|---|
| 10/26 "I want to stay as close to the edge as I can without going over."<br>Kurt Vonnegut | 10/26 | "For me the camera is a sketch book..."<br>Mark Twain |

} 1603

| What Matters Quote of the Day | | Find Quote   Edit \| Remove |
|---|---|---|
| 10/26 "For me the camera is a sketch book, an instrument of intuition and spontaneity..." Read full quote<br>Henri Cartier-Bresson | 10/27 | "By trying we can easily learn to..."<br>Mark Twain |
| ◀ XXXXXXXXXXX | | ▶ |

} 1605

↖ 1621

⎯1627  ⎯1623  ⎯1625

| What Matters Quote of the Day | | Find Quote   Edit \| Remove |
|---|---|---|
| 10/26 "For me the camera is a sketch book, an instrument of intuition and spontaneity..." Read full quote<br>Henri Cartier-Bresson | 10/27 | "By trying we can easily learn to..."<br>Mark Twain |
| ◀ XXXXXXXXXXX | | ▶ |

} 1609

| What Matters Quote of the Day | | |
|---|---|---|
| 10/26 "By trying we can easily learn to endure adversity..."<br>Mark Twain | 10/27 | "For me the camera is a sketch book..."<br>Henri Cartier-Bresson |
| ◀ 2006 ▶ Jan\|Feb\|Mar\|Apr\|May\|Jun\|Jul\|Aug\|Sep\|Oct\|Nov\|Dec | | [         ] Search |

} 1631

| What Matters Quote of the Day | Find Quote   Edit \| Remove | |
|---|---|---|
| 10/26 "By trying we can easily learn to endure adversity..."<br>Mark Twain | 10/27 | "For me the camera is a sketch book..."<br>Henri Cartier-Bresson |
| ◀ 2006 ▶ Jan\|Feb\|Mar\|Apr\|May\|Jun\|Jul\|Aug\|Sep\|Oct\|Nov\|Dec | | [         ] Search |
| ◀ XXXXXXXXXXX | | ▶ |

| > 2. CUSTOMIZE | Back to Step 1   Finish |
|---|---|
| Source Preferences<br>[What Matters Quotes ⇅] | Display Preferences<br>☑ Show Date |

} 1611

| > 2. CUSTOMIZE | Back to Step 1   Finish |
|---|---|
| Source Preferences<br>[Custom Quote Feed ⇅] → [Add Feed URL] | Display Preferences<br>☑ Show Date |

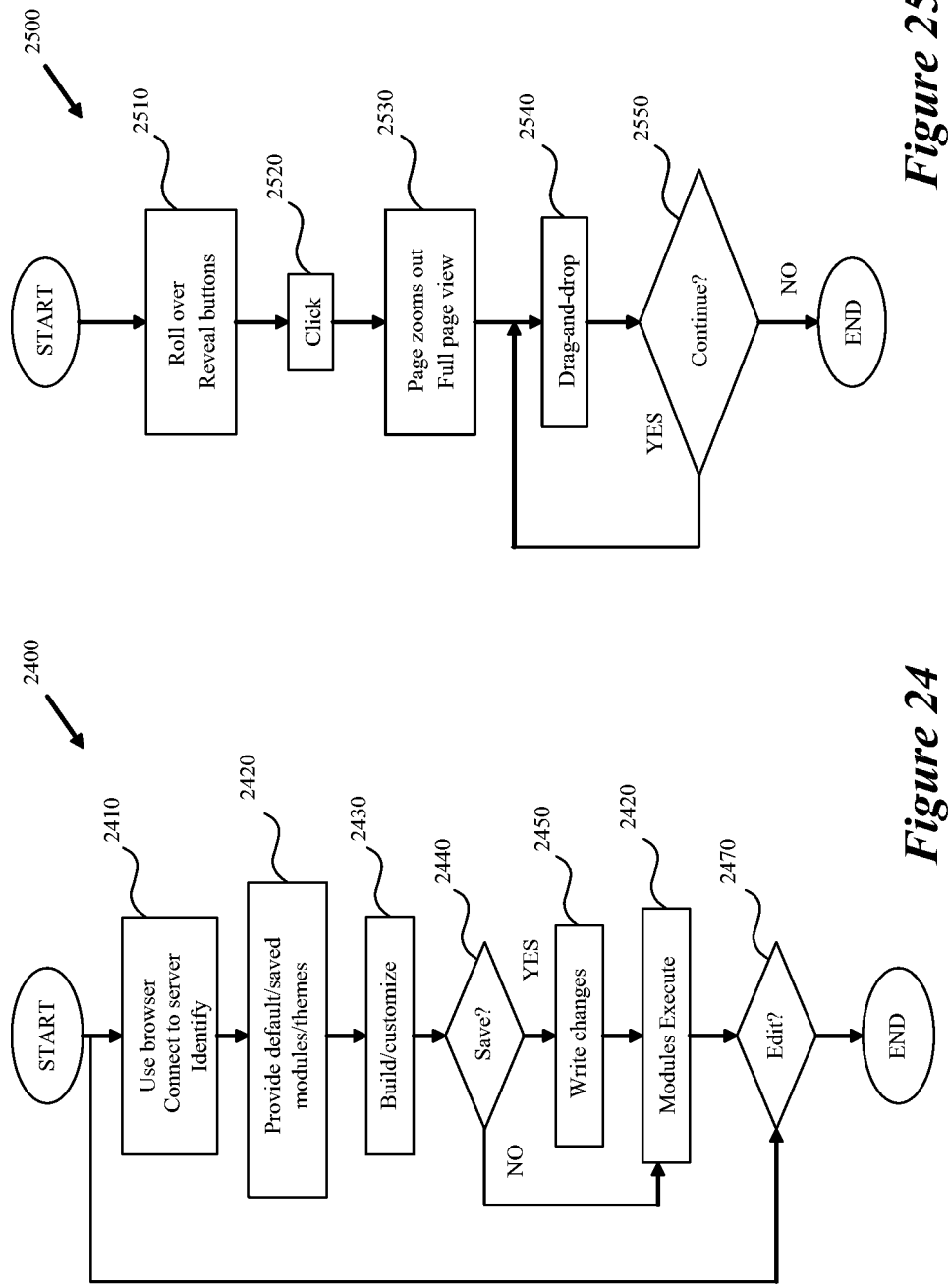

PAGE MODULES AND PROVIDING CONTENT

FIELD OF THE INVENTION

The present invention is related to the field of online content, and is more specifically directed to page modules and providing content.

BACKGROUND

Computer and computing device usage increases each year. Much of the increase in usage is spurred by internetworking of devices such as by using the Internet. With each new user and/or site coming online, the amount of information that is stored and accessible by computer systems around the world further increases. At the same time, the number, variation, and sophistication of computer users escalates, and user expectations also rise, regarding the functionality of tools, interfaces, and the user experience.

The Internet and other networks interconnect computers and computing devices to allow for transport of data over network connections. Computers and computing devices are often organized into client-server relationships. One type of server is a web server and an example of a client is a web client such as a personal computer running a web browser program. Some web servers provide portal services that collect information from various sources and upon request generate a portal page for the web client. An example of such a portal page is at the web site www.yahoo.com provided by Yahoo Inc. This web site also has facilities that support personalized pages. See, for example, my.yahoo.com.

Web servers typically service requests from web clients, by using a system of protocols. In response to requests received, the web server returns data responses. The hyper text transfer protocol (HTTP) is an example of a conventionally used protocol. One or more web clients issue requests directed at a particular web server address for a page represented by a universal resource locator (URL) in the request. A server responsive to the particular address responds with data such as a web page that is displayed, or with another type of data set.

Conventional technology used for the web has limitations. Presently, the web client typically employs a browser application that is capable of presenting to a user all or part of a web page in a user interface. The browser application further accepts user input to interact with the web page and/or web site. Web browsers are commonly used by users to navigate within a single web page and across several web pages. Web browsers often provide functionality in addition to presenting web pages and accepting user input related to web pages. For example, web pages often include executable program elements that are executed by a web browser upon receipt of a web page. These elements include a number of variations of application program interfaces (API).

Browser applications provide an interface for users to receive and/or interact with content via the Internet or the web. A browser application generally resides on a user's computer. The browser application includes a window for displaying content retrieved from web sites via the web or Internet. The browser application may also include one or more application toolbars. Web browsers provide information in the form of a web page, which is produced by interpreting a text document encoded by using hyper text markup language (HTML). Modem web page user interfaces typically employ sophisticated application programming interfaces, variations of JAVA, Flash, and other scripts and means of performing increasingly complex functions for a user and a user interface.

As mentioned above, current application and/or interface technologies have certain limitations. Moreover, despite the availability of vast amounts of information from numerous sources, not all information on the Internet, or even regarding a single topic, is relevant, useful, and/or meaningful to every user, all the time. When users are barraged with too much information, too many choices, irrelevant and/or disorganized content, humans and machine systems become overloaded, thereby diminishing the usefulness of otherwise powerful information tools.

SUMMARY

User Interface

A user interface for providing content includes several modules for displaying the content within a single page. A first module within the page is for presenting content from a first source and a second module is for presenting content from a second source. The first module is stacked on top of the second module within a window for presenting the page. The content provided by the first module is independent of the content provided by the second module such that a user interacts with the content of each module independently and without the need for navigation to a location external to the single page.

The user interface preferably includes a horizontal scroll bar for the first module, and additional content is presented through the first module by using the horizontal scroll bar. The first module has a variety of shapes or sizes during the user interaction with the first module, and the second module automatically adjusts to accommodate the shape and/or size of the first module. In a particular implementation, the dimensions of the first module resize to maximize the edge to edge horizontal view within a browser window. When the scroll bar reaches an edge of the content presented in the module, the content wraps to allow the user to continue scrolling, or alternatively, when the scroll bar reaches an edge of the content presented in the module, an option for more content is presented such that the user is discretely presented content that is sourced infinitely. The option for more content includes a click to reload button, a search function, or another suitable means for obtaining and presenting additional content.

Editing of Modules and Changing the Feed

The sources for the modules typically include feeds from a variety of sources. Preferably, a second feed for the second module is from a different source than a first feed. The modules include a state for a user of the interface to change a feed to one or more modules in the page. Embodiments of the invention include a zoom mode for reordering the modules. The zoom mode presents a full page view to the user. In the full page view, the layout of the page and modules is more readily ascertained by a user. The full page view has icons for indicating the direction of motion for reordering the modules, and the user advantageously reorders the modules in the page by using a drag and drop motion based on the indicators provided by the icons. In this manner, the location of each module is determined by the user.

Modules are optionally added or removed, and the presence of each module is determined by the user. Moreover, the content, feeds, and other features of each module are customizable such that the configuration of each module is determined by the user.

Example Module Types

Example, module types include an advertisement module, a quotes module for presenting quotes that are important to the user, a stock tracking module, a photo module configured for retrieving content from a photograph site such as flickr.com. A social content module is configured for retrieving content from a site where the content on the site is socially determined by a ranking system such as digg.com, for example. Another type of module is the gallery module that includes different templates that are configured for addition or removal to or from a page. For instance, in one embodiment, if a template in the gallery is clicked, the modules within the page slide upward and a new module based on the template is inserted onto the page of modules. These and additional modules are further described below.

States

Each module preferably includes several states such as, for example, a collapsed unrolled state, a collapsed rolled state, an expanded unrolled state, an expanded rolled state, a customization state, an announcement bar state, and a hidden or temporary remove state. The collapsed unrolled state increases the user's breadth of view of the modules on the page, and reduces the amount of detailed information for the user such that the content presented on the page and in this state does not overwhelm the user. In this unrolled state, a set of tools is preferably hidden from the user. The set of tools provides for in module navigation such as by including the horizontal scroll bar; and/or selections for edit and remove. This format is referred to as just in time and/or on demand content. Moreover, the content that is presented on the page and within each module is based on the specification of the user.

The collapsed rolled state is for presenting to a user a set of tools that appears when a cursor is positioned over a module in the unrolled state. The expanded unrolled state is for presenting additional content to the user such as images, video and/or audio multimedia clips, text in the form of captions, and the like. Preferably, the additional content is presented within the stacked module page format without drastic or unsightly changes to the interface, such as without pop ups, frames, and/or new windows, for example.

The expanded rolled state is for presenting a set of tools that are typically previously hidden in the unrolled state. As indicated above, the expanded rolled state comprises a detailed view that increases depth of presented information. The set of tools optionally includes multimedia tools in addition to the navigational tools such as, for example, an autoplay feature and/or a button for returning to a collapsed state. Another state is the announcement bar state that requires minimal space for presenting content within the page. Preferably, the modules are removable as part of the user customizability feature. However, some modules include a temporary remove state, such that modules in this state reappear within the user interface at a predetermined time. For instance, an advertisement module is advantageously placed in a temporary remove state by a user such that the user is allowed to control content, while permitting unobtrusive advertising to coexist with user customized content.

The configuration state is typically reached via a user selection in a rolled state for transitioning to the configuration state. When a module is selected for configuration, the selected module appears to flip in place on the page such that the user is presented with an edit mode for the module without altering the appearance of the other modules within the page of modules. In one implementation, the configuration state appears to be located on the back of a module selected for editing and/or user customization. The configuration state usually has a specific color to indicate the state of the module. The configuration state includes an option to save changes and an option to exit the configuration state. When the option to exit is selected, the configuration state of some embodiments appears to rotate in place to return to the state from which the configuration state was selected. Then, the changes made for the module are presented, in place where the module lies on the page.

A method of providing content includes using a browser to connect to a server and performing a check. The check includes a system check for a specific component and/or a user identification check for a specific user profile. Based on the check, the method provides a set of modules that form a page of modules. The method customizes a first module in the set of modules and saves the customization. The method executes a function provided by the module.

Sometimes, the set of modules includes a default set of modules, such as for a new user and/or a new browser connection. Alternatively, the provided set includes a saved set of modules that is provided based on a user of the browser, by using a login ID, a cookie, or another identifier. The method edits the customization at various times. The method provides, by using the first module in the set of modules, content located external to a storage location for the page of modules. Preferably, when the externally located content is updated, the content provided by one or more of the modules is automatically updated. The method reorders a module in the set of modules to alter the appearance of the page. The method selectively adds additional modules such as a second module, removes modules such as the first module, and/or temporarily hides or removes modules, then later presents the temporarily removed module within the page at a later time. Similarly, content, navigation, and/or other tools are hidden at various times.

The method vertically scrolls along a y-axis of the page to view particular modules within the page of modules particularly when the number of modules extends beyond a single page view. The method horizontally scrolls along an x-axis within a module, such as for navigation within the module. Preferably, the other modules within the page are unaffected by the horizontal scrolling within the module being horizontally scrolled. The method optionally adds content to the first module thereby increasing the available amount of horizontal scrolling. The method wraps the content within a module, or alternatively, provides an option for additional content when a limitation of the horizontal scrolling is reached.

The modules typically each have several states. The states include one or more of a collapsed unrolled state, a collapsed rolled state, an expanded unrolled state, an expanded rolled state, a customization state, an announcement bar state, and/or a temporary remove state. The modules selectively include various types such as a header module, a daily quote module, an advertisement module, a photo module, a stock module, a social content module, a spotlight type module, a popularity type module, a movie module, a news module, a gallery module, a suggestion or targeting module, and a footer module. Each type of module typically includes specific details and features based on the content for the module. For instance, when the module comprises a news module, the executing typically involves requesting a response from an RSS feed, when the module comprises a social bookmarking module, the executing further involves javascript object notation, or when the module comprises a photographic module, the executing further involves a REST type API. Additional modules are contemplated in embodiments of the invention. Additional examples include modules for movies, instant messaging, and email. In a specific implementation, performing the check comprises checking for a Flash component, and the executing step involves a Flash script.

A method of configuring a page positions a cursor over a particular location within the page and thereby reveals a set of tools for configuring the page. The method selects a tool and transitions to one or more modes for customization. One mode includes a reordering mode. When this mode is selected, the method zooms out the page to present a full page view of the page. From the full page view, the method selects a first module and moves the selected first module by using the cursor. Preferably, using the cursor comprises a drag-and-drop operation. When a first module is selected within the full page view, the method preferably provides a visual cue that illustrates the possible directions of movement of the selected first module for reordering. When the first module is moved, the method automatically adjusts a second module that is near to where the first module is moved.

System and Granular Events

A system for providing content includes a client device, a server, a browser application, a user interface, a page, several modules, and a first module among the several modules. The first module includes several states. The client device typically includes the browser application which is used to couple to the server. The server provides the page and the modules to a user. The user advantageously uses and customizes the page, modules, and states for greater relevance and/or greater usability to the user, as described above. Preferably, the modules are presented within a single page, and each user interaction within the single page comprises a granular event. Accordingly, some embodiments include systems and methods of recording, for the single page, the granular events. For instance, users are advantageously profiled and/or behaviorally targeted based on the granular event recording. The granular events include a mouse over event and/or a click within the page.

BRIEF DESCRIPTION OF THE DRAWINGS

The novel features of the invention are set forth in the appended claims. However, for purpose of explanation, several embodiments of the invention are set forth in the following figures.

FIG. 7 illustrates an announcement bar.
FIG. 8 illustrates an advertisement module.
FIG. 9B illustrates a social content module in expanded unrolled and rolled states.
FIG. 10 illustrates reordering of modules.
FIG. 16 illustrates a daily quote module.
FIG. 24 illustrates a process in accordance with embodiments of the invention.
FIG. 25 illustrates a reordering process according to some embodiments.

DETAILED DESCRIPTION

Figure 1:
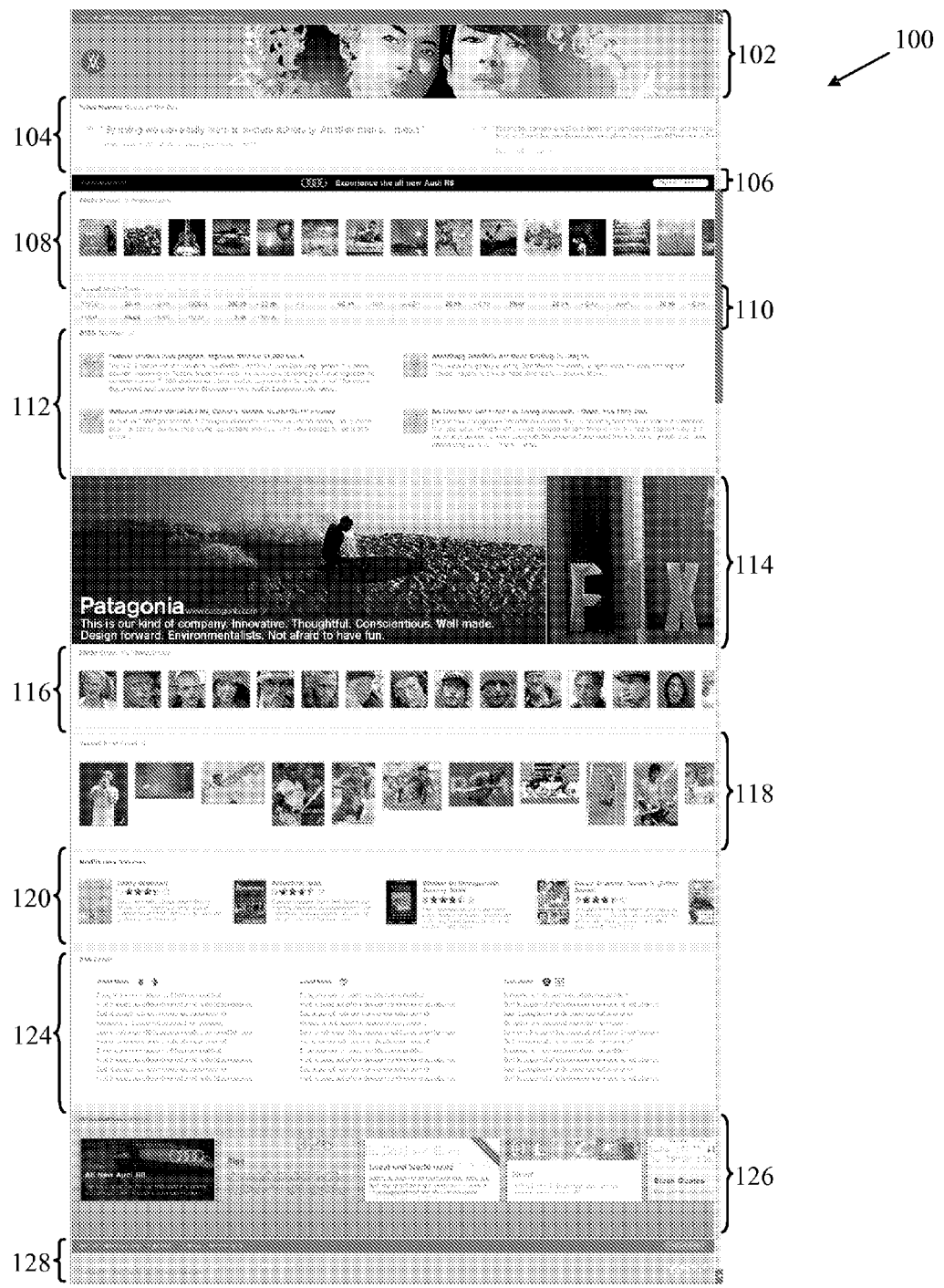
FIG. 1 illustrates a page and several modules according to some embodiments of the invention.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Embodiments of the invention include architectures for presenting information, including web pages. The web pages preferably include aggregate and/or full page views for presenting breadth of information, while reducing irrelevant or untimely information. These embodiments are referred to herein as collapsed views or states. Further embodiments include expanded views or states that provide additional depth of information. The views and information are provided through a user customizable interface. Preferably, the interface is segmented into discrete modules. The modules are conveniently added, edited or customized, reordered, hidden, and/or removed. Moreover, the interface has advantageous features for the selective presentation of content. The content of these embodiments, and the tools for obtaining and/or customizing the content, is said to be just in time and/or on demand.

For instance, within each of the expanded and collapsed states, some implementations include a roll over state. This state is achieved by positioning a cursor over a selected module by using a pointing device such as a mouse, track ball, track pad, or other device. When the roll over state is achieved, certain previously hidden information and/or navigation tools appear for use by the user. Some examples of the information and/or tools that optionally appear include click buttons and/or sliding mechanisms for scrolling. Particular implementations include a horizontal scrolling means for the selective display of a variable amount of content. The content is optionally user configured and/or automatically configured. For instance, the content often includes data that is crawled from several sources by using application programming interfaces (API's) and/or really simple syndication (RSS) feeds.

Due to the structure of some of these embodiments, certain advantages are implemented regarding on page analytics. For instance, granular event counting and/or recording is advantageously achieved for data collection, behavioral profiling, and/or targeting. These page analytics are optionally collected and/or processed in conjunction with conventional click stream data.

Personalization or Customization of Exemplary Modules, Configurations, and States As mentioned above, embodiments of the invention include a framework that houses each content type systematically as modules. The modules are edited, added, removed, rearranged, reordered, and/or closed to create a nearly unlimited number of combinations. Moreover, as mentioned above, each module typically includes a plurality of states. The foregoing and additional features are further described in relation to particular examples.

FIG. 1 illustrates a page 100 and several modules in accordance with embodiments of the invention. As shown in this figure, the modules include a header module 102, a daily quote module 104, an advertisement module 106, two photo modules 106 and 116, a stock module 110, a social content module 112, a spotlight type module 114, a popularity type module 118, a movie module 120, a news module 124, a gallery module 126, and a footer 128.

Preferably, the content provided by each module has particular relevance for a specific user. Further, the content is generally stored at an external location to the page 100. In these cases, the content is advantageously retrieved and/or presented in an aggregated fashion, and has additional advantageous features, such as automatic updating, and/or organization by a desirable characteristic, such as by relevance, popularity, and/or recency, for example. For instance, the social content module 112 includes articles that are community determined by voting or another means. Preferably the content is obtained in an automated manner from an external site. The web site digg.com is an example of a social content web site.

One of ordinary skill recognizes that the illustrated modules are exemplary in both variety and number, and further recognizes additional modules and combinations of modules. For instance, some implementations include a social bookmarking module for presenting to a user a set of most recent and/or most used bookmarks. Preferably, the information regarding the bookmarks is stored at a location and/or web site that are external to the social bookmarking module. The web site del.icio.us is an example of such a site. Advantageously, the social bookmarking module provides and/or stores a set of bookmarks that are of interest to the user. Regardless, of the particular content presented, the module provides a customizable interface for the client, without the need for navigation to or at an external site, and without the need for additional customization at another location through a different interface.

Additional examples of the various possible modules are further described herein, and by reference to the accompanying figures. For instance, a discussion of the quote of the day module follows in relation to FIG. 18, the stock module by reference to FIG. 20, the spotlight type module in relation to FIG. 11, the photo module is described by reference to FIG. 12, the movie module in conjunction with FIG. 15, the news module in relation to FIG. 17, and the popularity type module is of various types such as, for example, a news photos module, which is illustrated in FIG. 21.

Figure 2:
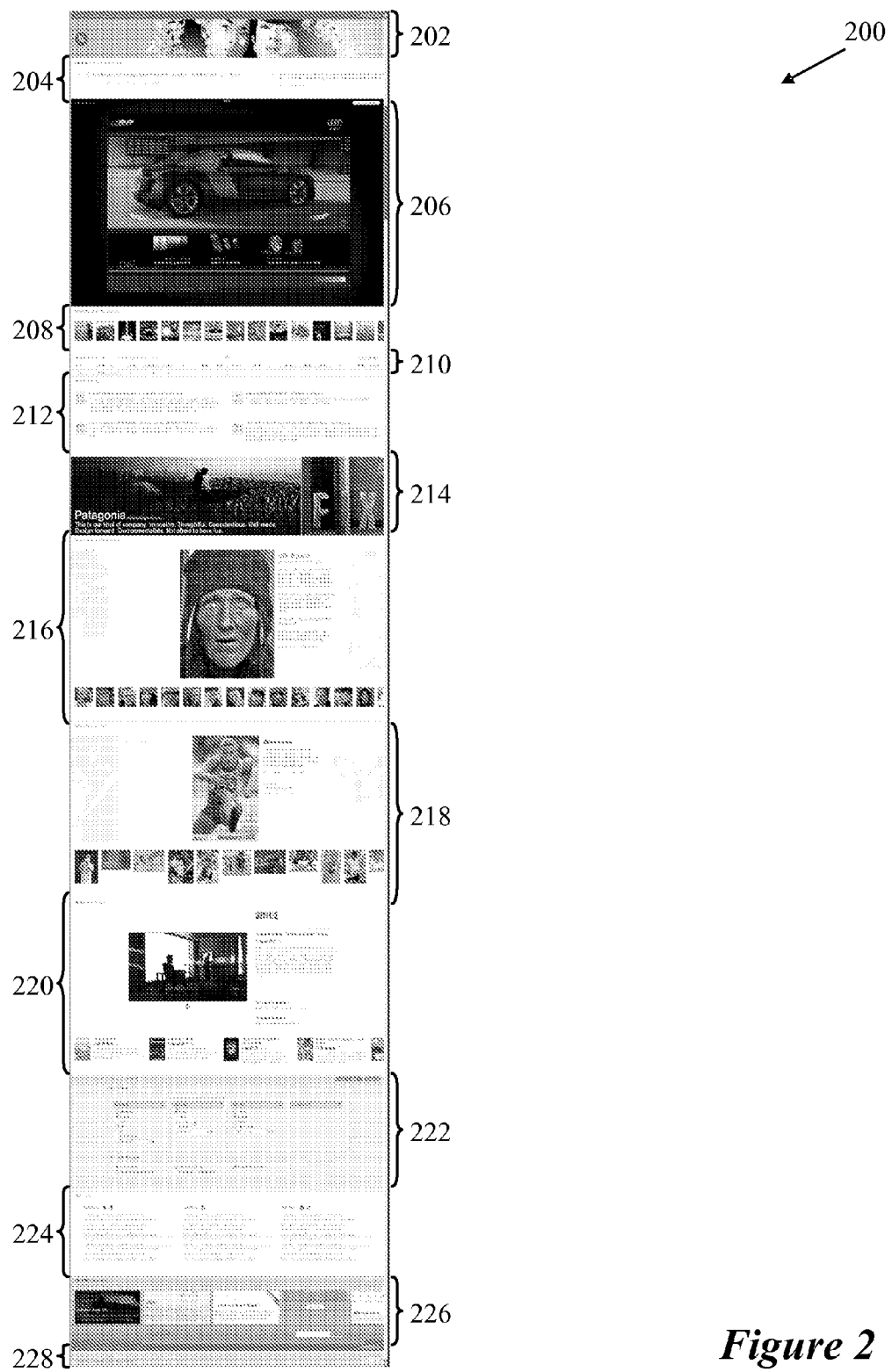
FIG. 2 illustrates a page with expanded modules.

FIG. 2 illustrates a page 200 that has modules in an expanded state. More specifically, the ad module 206, photo module 216, and movie module 220 are illustrated in an expanded state. In the expanded state, the module presents more detailed information regarding the content presented by the module. In some embodiments, the dimensions of the module expand slightly to accommodate the more detailed content and/or a more detailed format for the content.

Preferably, certain modules within the page 200 have a user selectable customization state. FIG. 2 further illustrates a module configuration and/or customization state 222. Most modules in the page 200 are user configurable, however, the ad module 206 is preferably not user configurable. In an embodiment, the user selects the module for configuration by using a button within the user interface for the module. When the button of some embodiments is clicked, the selected module transitions to another state by using an animated sequence, within the user interface.

For instance, when a user selects a particular module for customization, the selected module of a particular implementation transforms in place. In some implementations, the module appears to rotate in place without affecting the adjacent modules. To a user, the customization state intuitively appears to be present on the back of the module selected for customization. Further, some implementations display the customization state in a particular color such as green. These implementations provide a more fluid and contextual experience to a user who is customizing a single module within a page, or multiple modules on the page.

Figure 3:
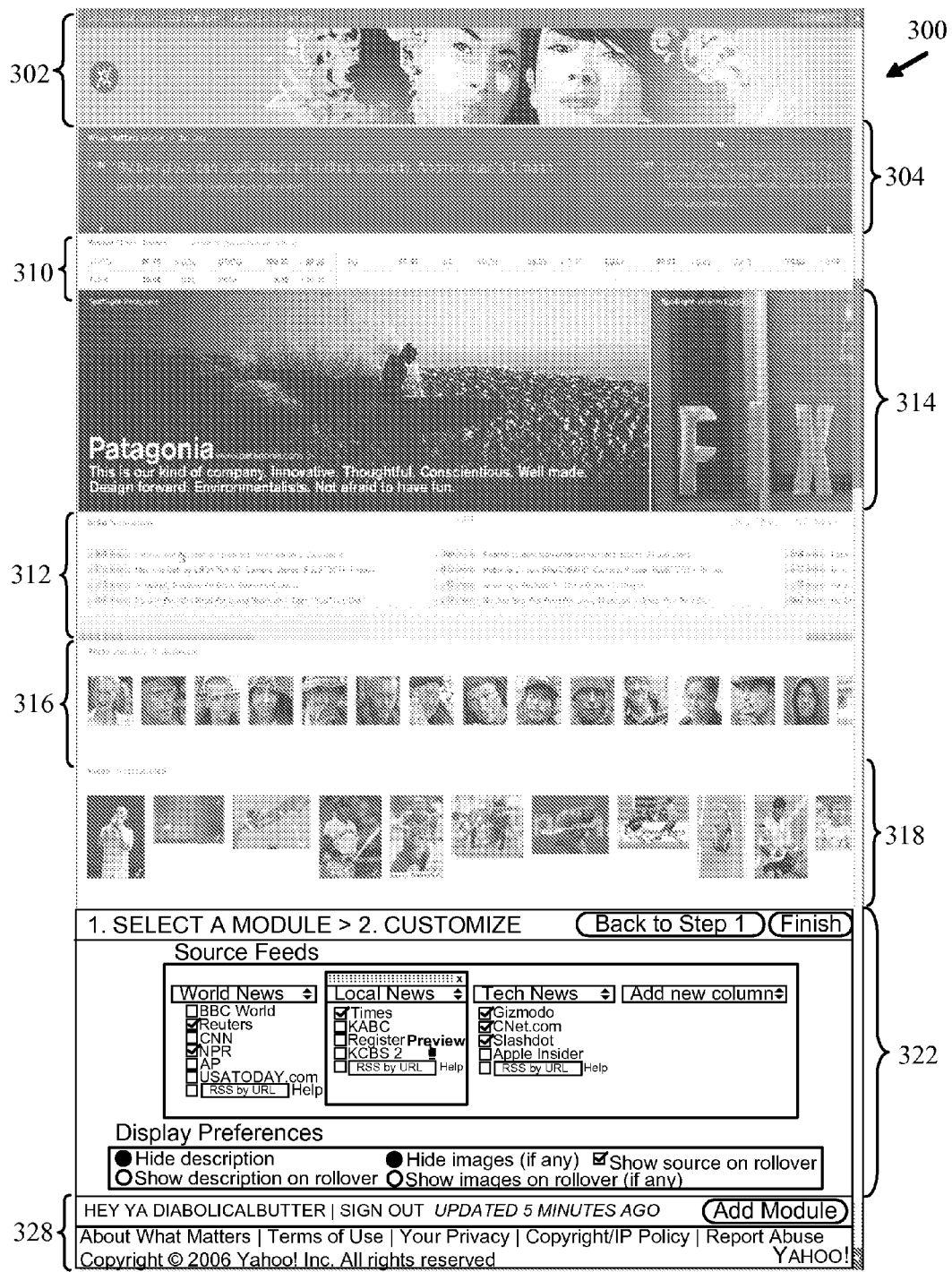
FIG. 3 illustrates customization in further detail.

FIG. 3 shows a page 300 with a module in the customization state 322 in further detail.

The particular customization state is for the news module 224 of FIG. 2. As shown in this figure, the customization state 322 for the news module includes guided settings, for source feeds, and for display preferences. The source feeds illustrated include World News, Local News, Tech News, and a selection to include additional types of news. One of ordinary skill will recognize additional news source feeds that are alternatively included or excluded from the module. In FIG. 3, the ad module 206, and movie module 220 of FIG. 2 are removed, or alternatively, hidden from view. As shown in FIG. 3, the remaining modules automatically adjust to reshape, resize, and/or provide additional content to the available space.

RSS Feeds

Web content syndication is an increasingly popular way for content providers to draw attention and visitors to web pages or sites. Using content syndication technologies such as really simple syndication (RSS), a content provider advantageously creates an XML summary of the site's content. The summary, which typically includes a number of headlines having various segments such as a title, a link to the content, and a brief description, is stored on the originating site's web server as an RSS feed. The RSS feed is manually created and updated such as by editing the XML, for example, or automatically, such as by using various scripts to periodically scan the site and update the XML. Operators of web sites, or individual users, conventionally subscribe a page to the RSS feed by including a reference to the desired RSS feed in the HTML or other source code for the subscribed page. Some embodiments provide an intuitive user interface for potentially many and varied such subscriptions, all on a single page, without the need for navigation to additional pages.

When the subscribed content is displayed such as through one or more modules, the RSS feed, which is maintained on the originating site's server, is accessed, and the title of each item in the summary is displayed on the subscribed page as a link. Conventionally, a viewer of the subscribing page clicks on any of these links to view the item at the originating site. According to embodiments of the invention, a user preferably aggregates those RSS feeds from all of the websites the user wishes, onto a single master page that the user controls and views in a consolidated format without the need for additional navigation, tools, and/or programming effort. By viewing the user's customized master page, the user conveniently sees new content as it is added and/or updated to any of the sites.

The interface to the externally located content is based on the nature of the content and/or the module type. For instance, the social bookmarking module optionally uses javascript object notation (JSON) to request and receive content form an external site such as the site del.icio.us, while a module that obtains content from a photograph site such as flickr.com uses the REST API. Additional protocols and/or application programming interfaces are contemplated for additional content modules such as movie and ad modules having video content, map, email, and instant messaging modules, for example.

Figure 4:
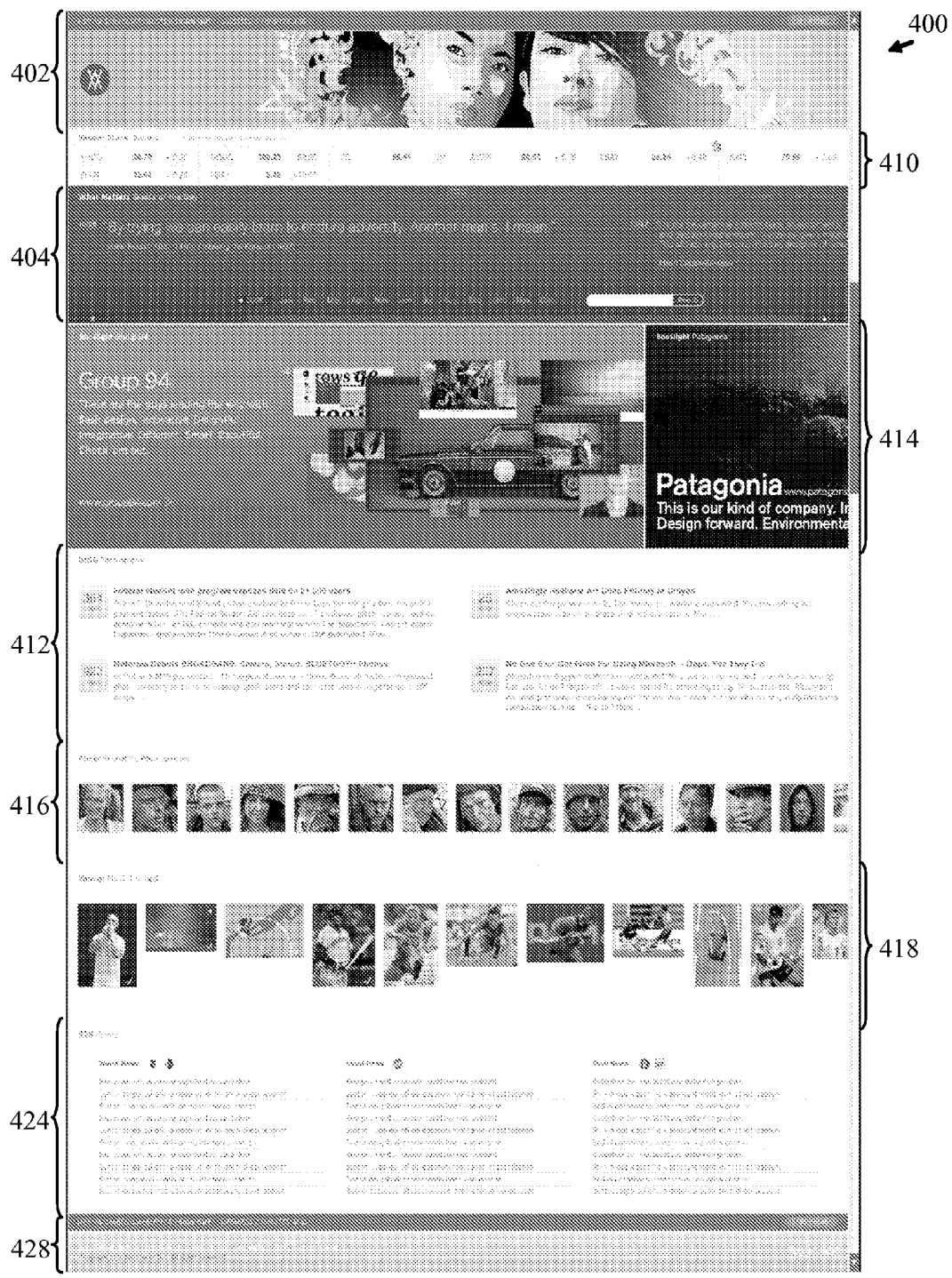
FIG. 4 illustrates modules reordered.

FIG. 4 illustrates a customized version of a page 400 of modules. For instance, a stock module 410 has been reordered to appear between the header module 402, and a daily quote module 404. Similarly, a spotlight module 414 has been reordered between the daily quote module 404, and a social bookmarking module 412, followed in top to bottom sequence by a photo module 416, a popularity module 418, a news module 424, and a footer 428. Also, shown in FIG. 4, ad modules are removed and/or temporarily hidden from view.

Figure 5:
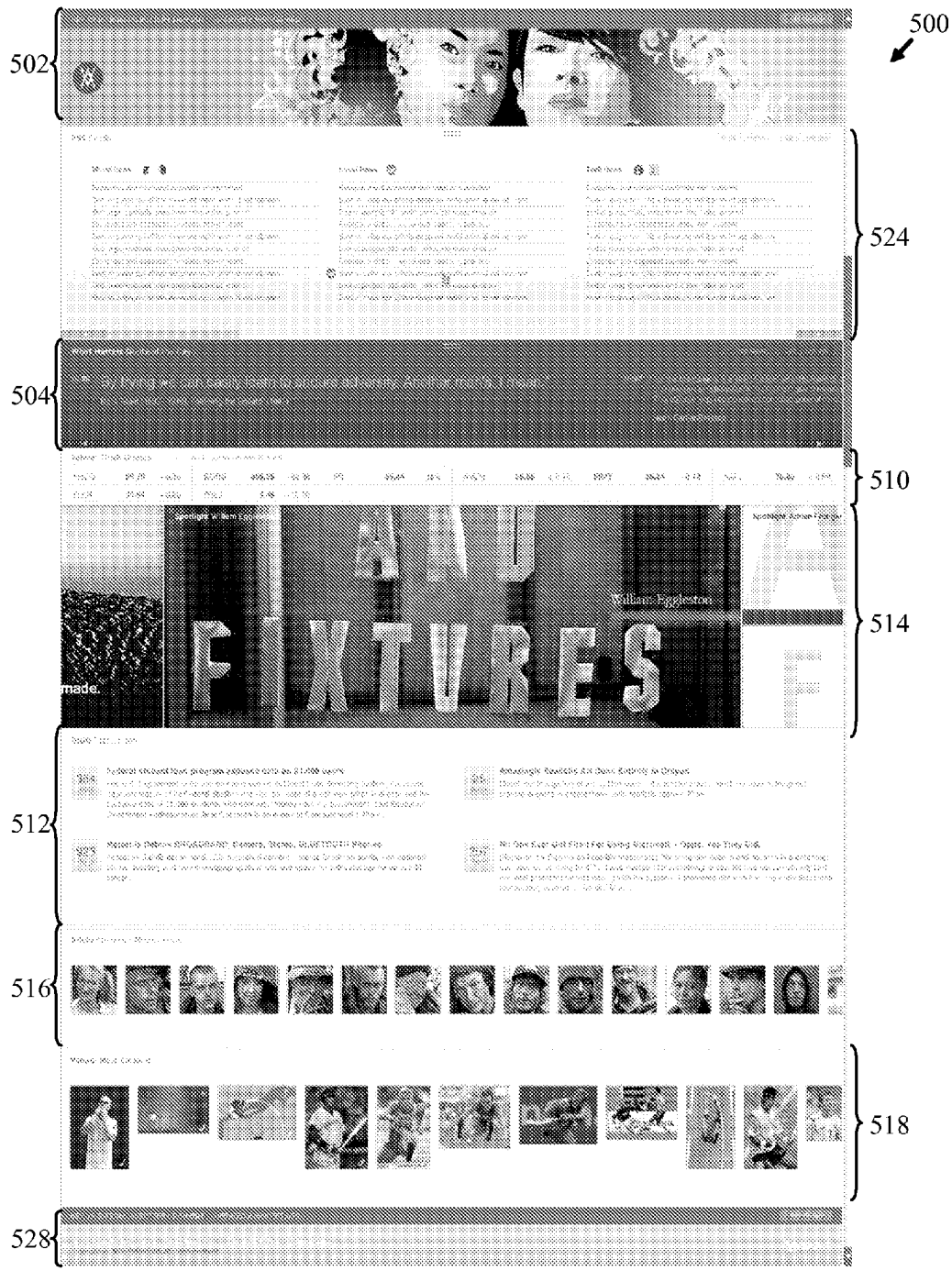
FIG. 5 illustrates modules removed.

FIG. 5 illustrates another customization for a page 500 of modules. In this figure, a news module 524 appears at the top of the page 500, between a header 502 and a daily quote module 504. The daily quote module 504 is followed by a stock module 510, a spotlight type module 514, a social content module 512, a photo module 516, a popularity type module 518, and a footer 528.

Figure 6:
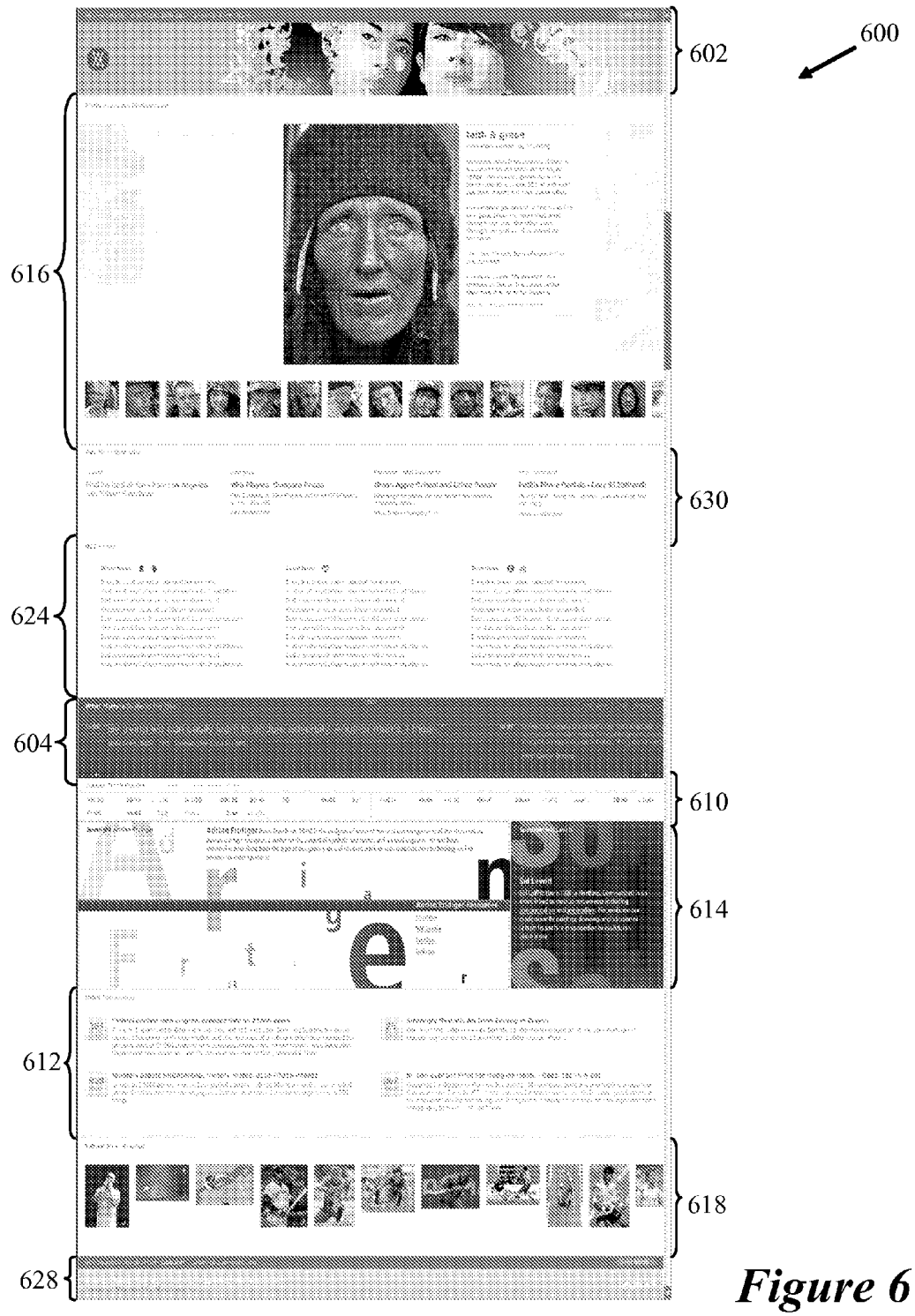
FIG. 6 illustrates an added module.

FIG. 6 illustrates an alternative configuration for a page 600 of modules. As shown in this figure, a photo module 616 appears between a header module 602, and a suggestion, ad and/or targeting module 630. This module 630 in some embodiments pushes content to the particular user based on the user's profile or other information known about the user.

FIGS. 7 and 8 illustrate that the modules 706 and 806 of some embodiments have an announcement bar state. In FIG. 7, the announcement bar 706 includes brief information that may have interest to a user. However, the slim nature of the announcement bar 706 is advantageous and requires little space. Should the user have an interest in additional information, the announcement bar state is easily expanded to another state to provide greater detail. Further, should the user prefer, the announcement bar is optionally removed and/or hidden from view. As shown in this figure, once removed, some modules will reappear at a later time. Also optionally, some embodiments will present the user with a brief instruction regarding retrieving the module and/or announcement bar, once removed or hidden.

FIG. 8 illustrates an ad module 806 in the announcement bar state 801, and in an expanded state 809. FIG. 8 further illustrates a user instruction regarding the removal of the ad module 806.

States

As mentioned above, embodiments of the invention employ on demand and/or just in time mechanisms for providing content, navigation, and/or other information and tools. Accordingly, each module typically includes a plurality of states such as, for example: (1) a collapsed view unrolled state, (2) a collapsed view rolled state, (3) an expanded view unrolled state, and (4) an expanded view rolled state. Some modules further optionally include (5) a customization state, (6) an announcement bar state, and/or (7) a temporary remove state. Each of these states is discussed further in relation to FIG. 9.

Figure 9A:
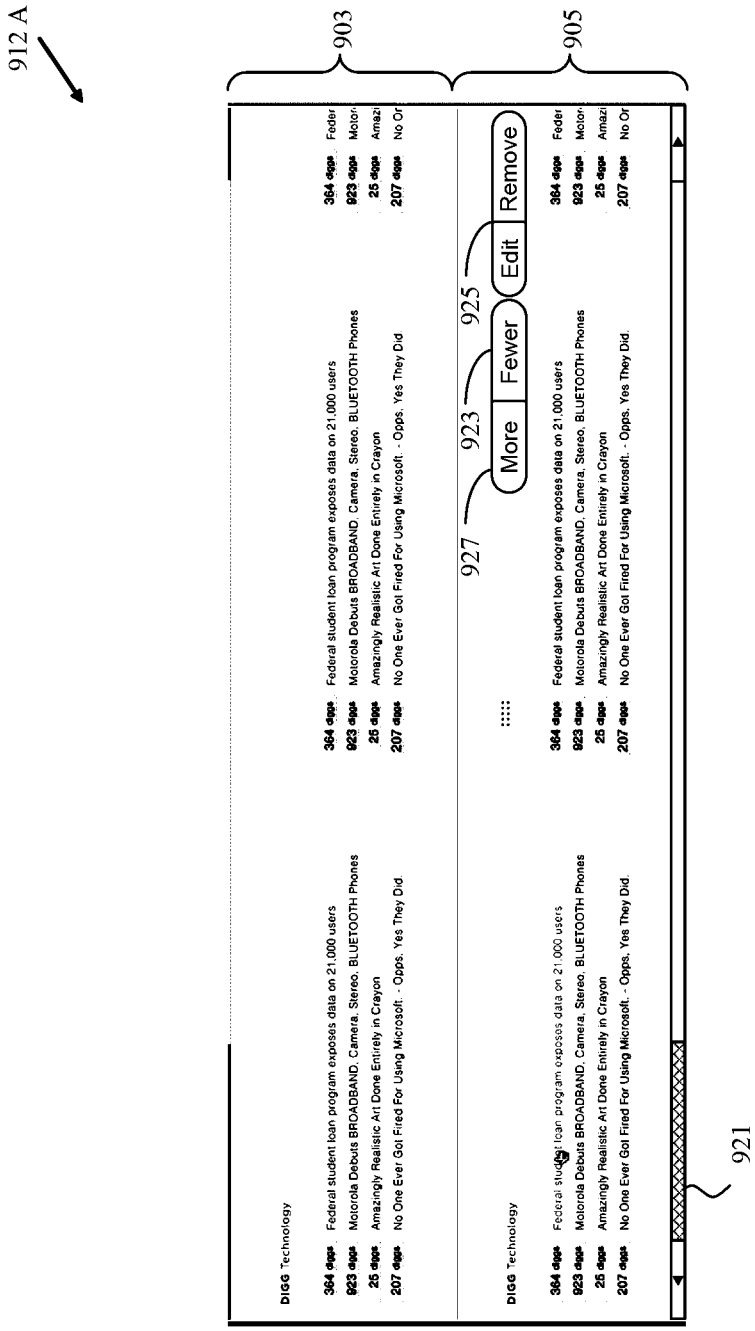
FIG. 9A illustrates a social content module in collapsed unrolled and rolled states.
Figure 9B:
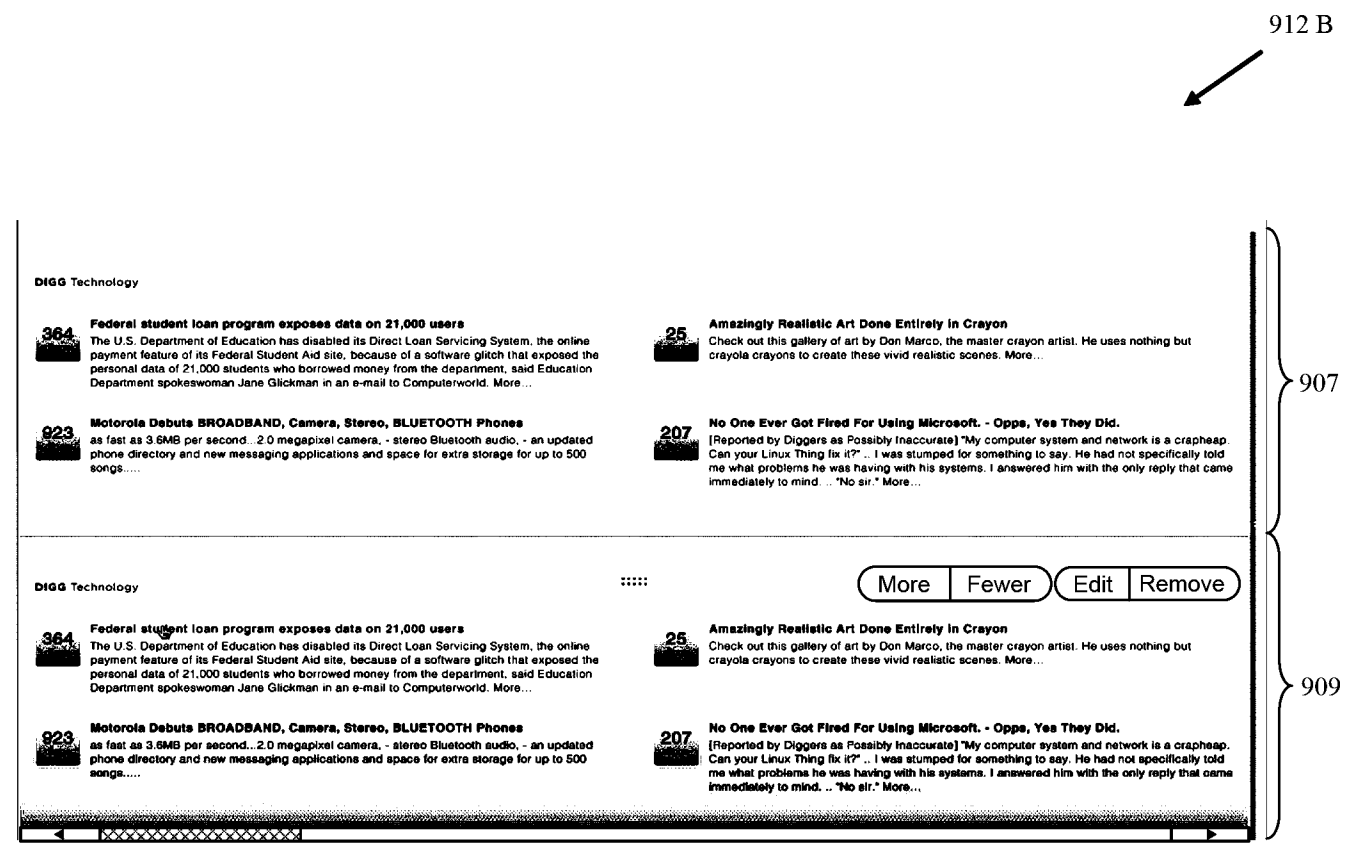
Figure 9C:
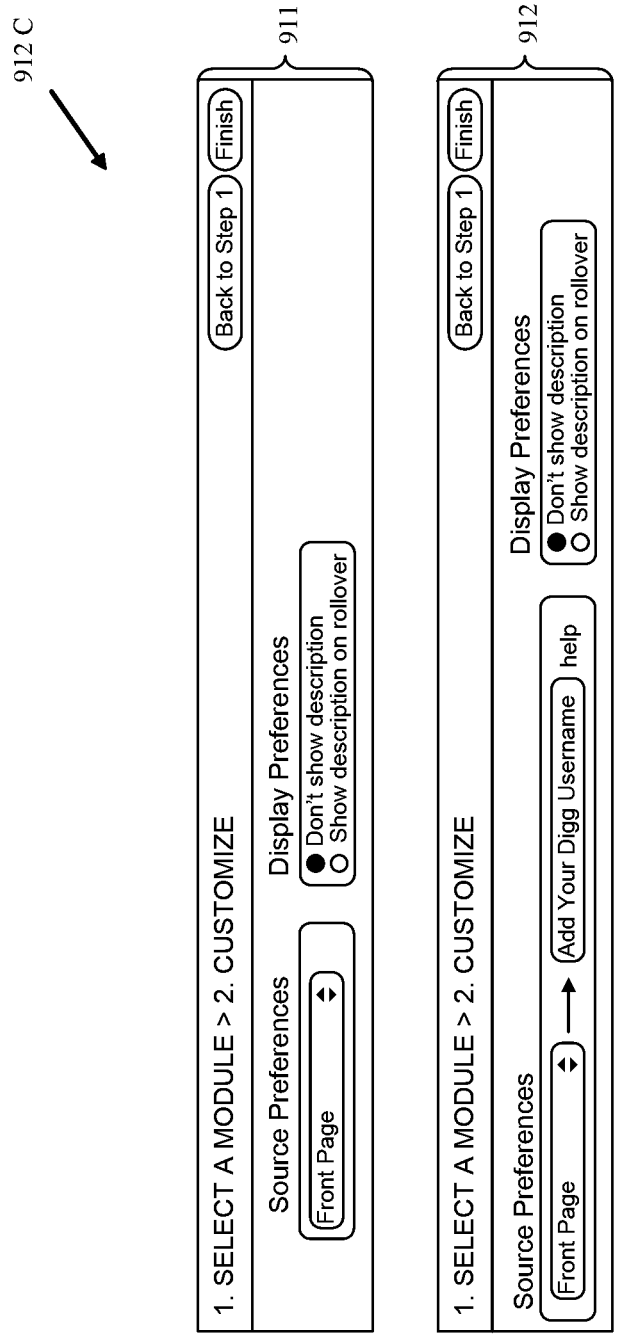
FIG. 9C illustrates a social content module in customization states.

FIGS. 9A, 9B, and 9C illustrate a social content module 912 in various states. As shown in these figures, the states include a collapsed unrolled state 903, a collapsed rolled state 905, an expanded unrolled state 907, an expanded rolled state 909, and, configuration states 911 and 913. When in the collapsed state 903, the social content module 912 presents only one-line headlines for each article presented by the module 912. The module 912 preferably draws its content from a website that presents socially determined content. Hence, the social content module includes articles that are community determined by voting or another means. Preferably the content is obtained in an automated manner from an external site. The web site digg.com is an example of a social content web site.

In this figure, the social content module 912 is configured for receiving content from the digg.com web site. At digg.com, the content is chosen by the users of the site, such as by using each article's number of "diggs." Hence, the illustrated embodiment further presents each article's number of diggs, or votes on digg.com's voting system. When in the collapsed rolled state 905, each article's headline and number of diggs is further accompanied by a brief abstract of the article. In this manner, some embodiments present just in time and/or on demand content. Moreover, since the module 912 employs a feed from an external site, where the content is updated based on the site's users, the content preferably updates automatically within the module 912, as it updates on the external site, or within a predetermined time.

Also shown in FIG. 9, the collapsed rolled state 905 presents tools for adjusting the content and/or obtaining additional content such as the horizontal slider 921 and the more and fewer buttons 927. Some embodiments further include additional tools such as an edit button 923, and a remove button 925 for customizing or removing the module 902. The expanded states 907 and 909 include additional content in the form of a brief text caption relating to each headline. The customization states 911 and 913 allow user customization for the module 912, and are further described below.

FIG. 10 illustrates the reordering of modules in additional detail. As shown in this figure, the header 1002 and footer 1028 modules are usually fixed. Accordingly, adjacent these modules 1002 and 1028 are icons indicating that these modules 1002 and 1028 are preferably not reordered. In some embodiments, the icon only appears when the module is selected for reordering. Further, the daily quote module 1004 immediately adjacent to the header 1002 is only reordered to a downward position, as indicated by the direction of the arrow icon adjacent this module 1004. Similarly, the module 1024 that is immediately adjacent the footer 1028 is only reordered to an upward position. The modules 1006, 1008, 1010, 1012, 1016, and 1018, that are not immediately adjacent the header 1002 or footer 1028, are reordered in either upward or downward directions, as indicated by the bidirectional arrows.

Figure 11:
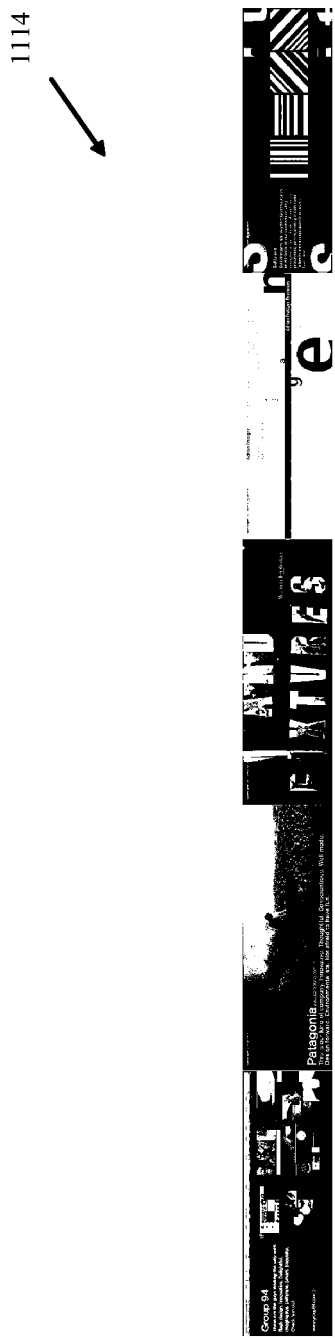
FIG. 11 illustrates a spotlight type module.

FIG. 11 illustrates a spotlight type module 1114 in further detail. As shown in this figure, the module 1114 focuses on several items of content including, for instance, Group 94, Patagonia, William Eggleston, Adrian Frutiger, and Sol Lewitt. One of ordinary skill recognizes the variety and depth of content that this module 1114 is capable of presenting. For instance, the module 1114 is shown in a collapsed state, however, additional depth for each content item is readily available in the expanded state and/or rolled over state for the module 1114. Moreover, when coupled with the horizontal scrolling of some embodiments, the content presented by the module 1114 is only limited by the amount of content that is desired to be provided, which is potentially infinite. In one implementation, an option to include or search for additional content is located at the right and/or left edges of the module when the ends of the presented content are reached.

Figure 12:
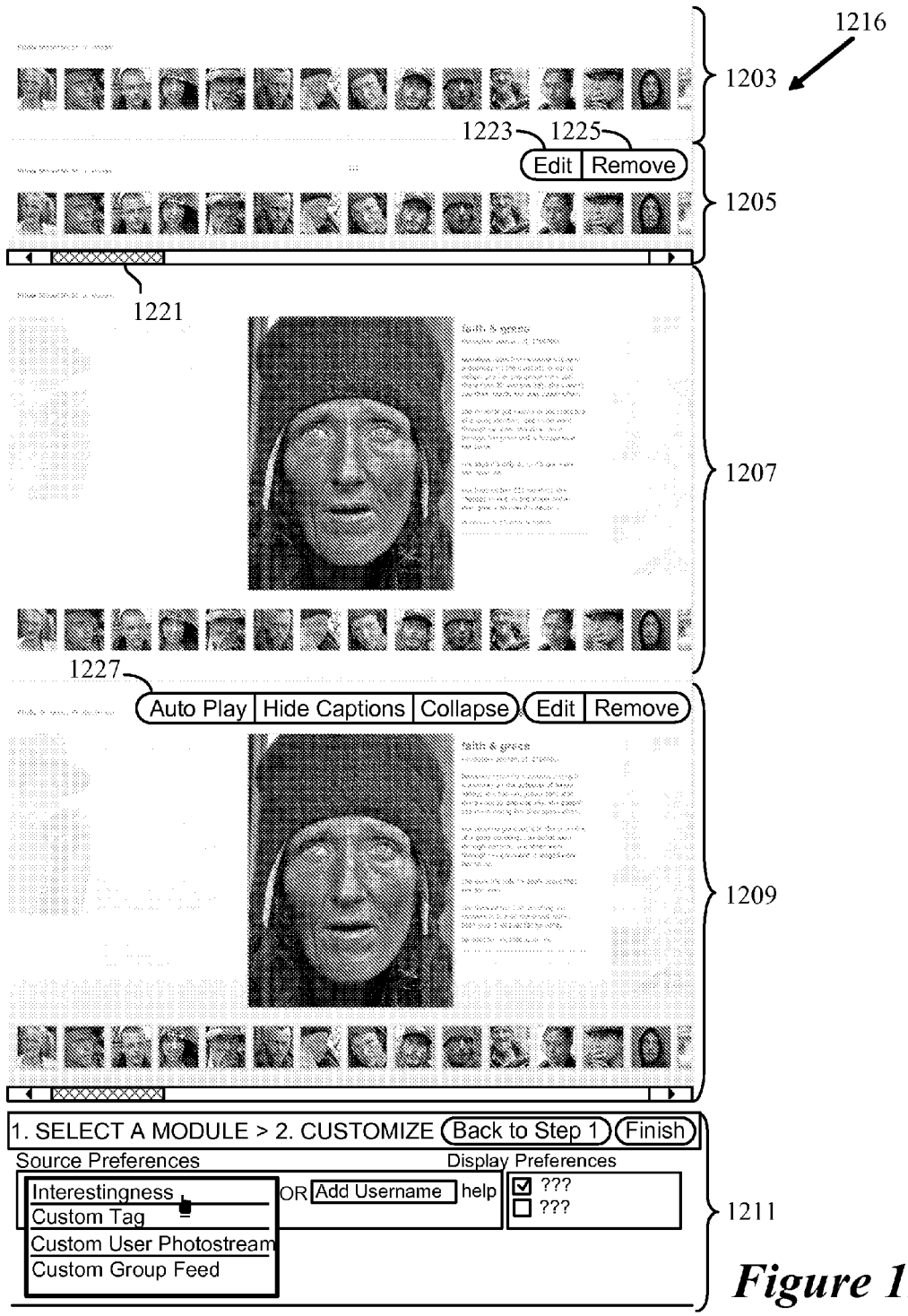
FIG. 12 illustrates a photo module.

FIG. 12 illustrates a photo module 1216 in various states including a collapsed unrolled state 1203, a collapsed rolled state 1205, an expanded unrolled state 1207, an expanded rolled state 1209, and a customization state 1211. The collapsed states 1203 and 1205, present a thumbnail or preview image for quick scanning of a potentially large data set. The expanded states 1207 and 1209 present a selected photograph in greater detail such as, for example, by enlarging the image and/or by including a description of the image. The rolled states 1205 and 1209 include a horizontal scrolling bar 1221 for previewing and presenting a small or large amount of content. The collapsed rolled state 1205 includes buttons for edit 1223 and remove 1225 of the module 1216. The expanded rolled state 1209 further includes additional tool buttons for auto play, hide captions, and/or collapse of the content and/or state.

In particular embodiments, when the edit button is clicked 1223, the module 1216 transitions to the customization state 1211. The transition preferably occurs by an aesthetic rotation in place that makes the customization state 1211 appear on the back of the module 1216. Some customization states 1211 have a distinct color such as green. The customization state 1211 allows adjustments to the source and display preferences of the content within the photo module 1216. Preferably, the customization of the module 1216 is performed on the page of modules, with the other modules in tact such that the page layout is retained, and without the need for external tools and/or navigation. The photo module 1216 obtains content from an external site such as flickr.com, and in this figure, is more specifically configured to receive Stoneth's photo stream. However, one of ordinary skill recognizes a number of photo streams and/or external sites for photographic and other content.

Figure 13:
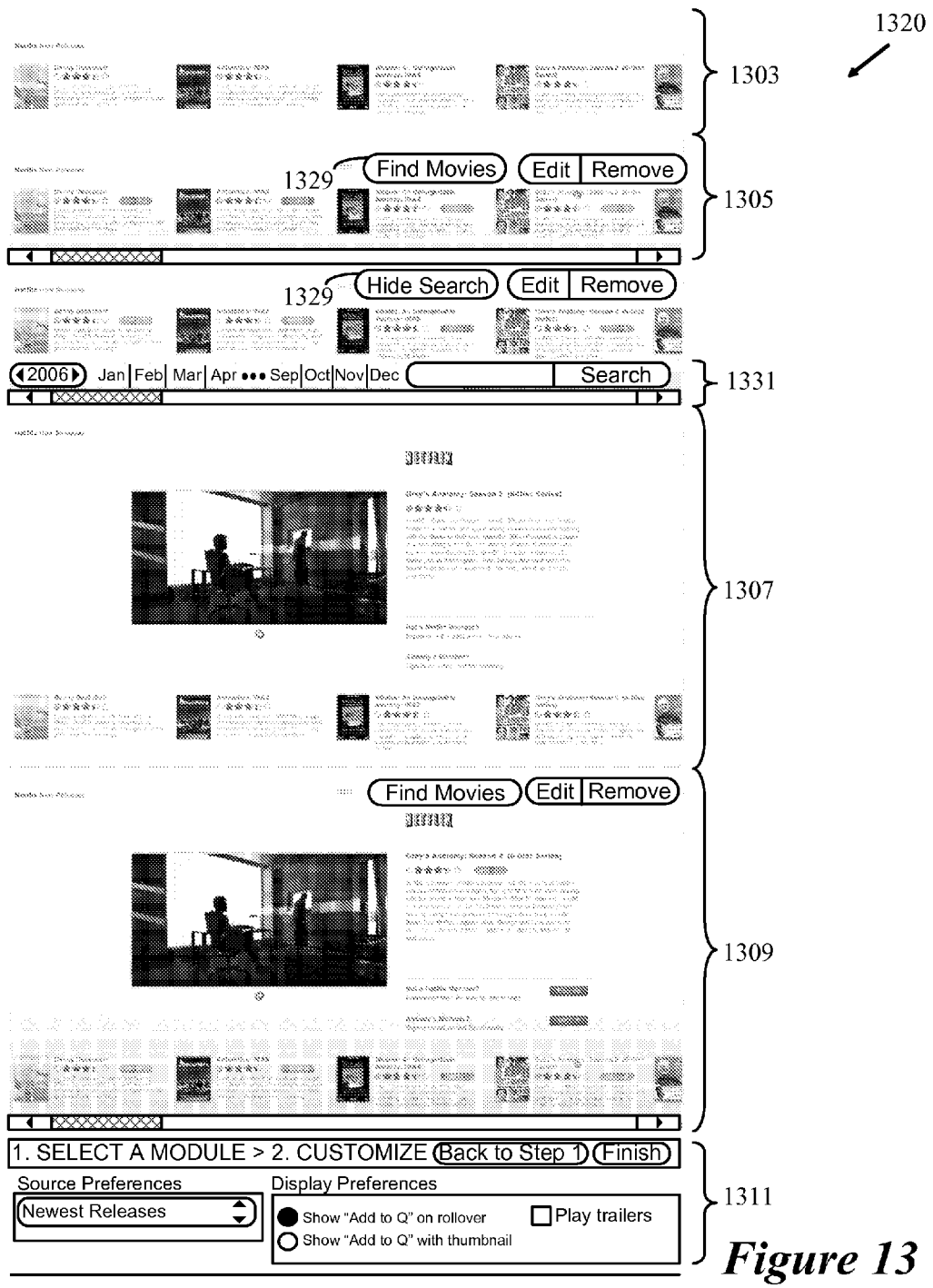
FIG. 13 illustrates a movie module.

FIG. 13 illustrates a movie module 1320 in several states. The states include a collapsed unrolled state 1303, a collapsed rolled state 1305, an expanded unrolled state 1307, an expanded rolled state 1309, and a customization state 1311. As described above, the collapsed rolled state 1305 reveals additional content and/or tools. In this figure, the collapsed rolled state 1305 reveals a button 1329 for performing a search for desired content. When clicked, a search bar 1331 appears for identifying and presenting the desired content, and the button 1329 transitions to allow hiding the search bar 1331. As shown in the figure, the search bar 1331 includes an organization by year and/or month, and a field for entering search terms and/or other criteria.

The expanded states 1307 and 1309 preferably show a preview image from a selected movie, and/or a description of the movie. Alternatively, the expanded states 1307 and 1309 show a brief teaser or trailer from the movie. Regardless of the particular type and format of content, the presentation of content and/or execution of each module preferably does not affect the other modules on the page of modules. The customization state 1311 allows the user to adjust the source and/or display preferences for the movie module 1320.

Some embodiments direct advertisement modules toward a user that are based on a particular module and/or the user's interaction with the module. Optionally, specific advertisements are targeted toward a user based on information regarding the user. For instance, some embodiments target ad modules toward a user based on the user's interaction with the movie module 1320. In these embodiments, when a user has an affinity for a movie, an ad module is advantageously delivered to the user. An example of an indicator of affinity is when the user expands a module regarding a movie such as Nacho Libre. One of ordinary skill recognizes additional indicators of affinity.

Figure 14:
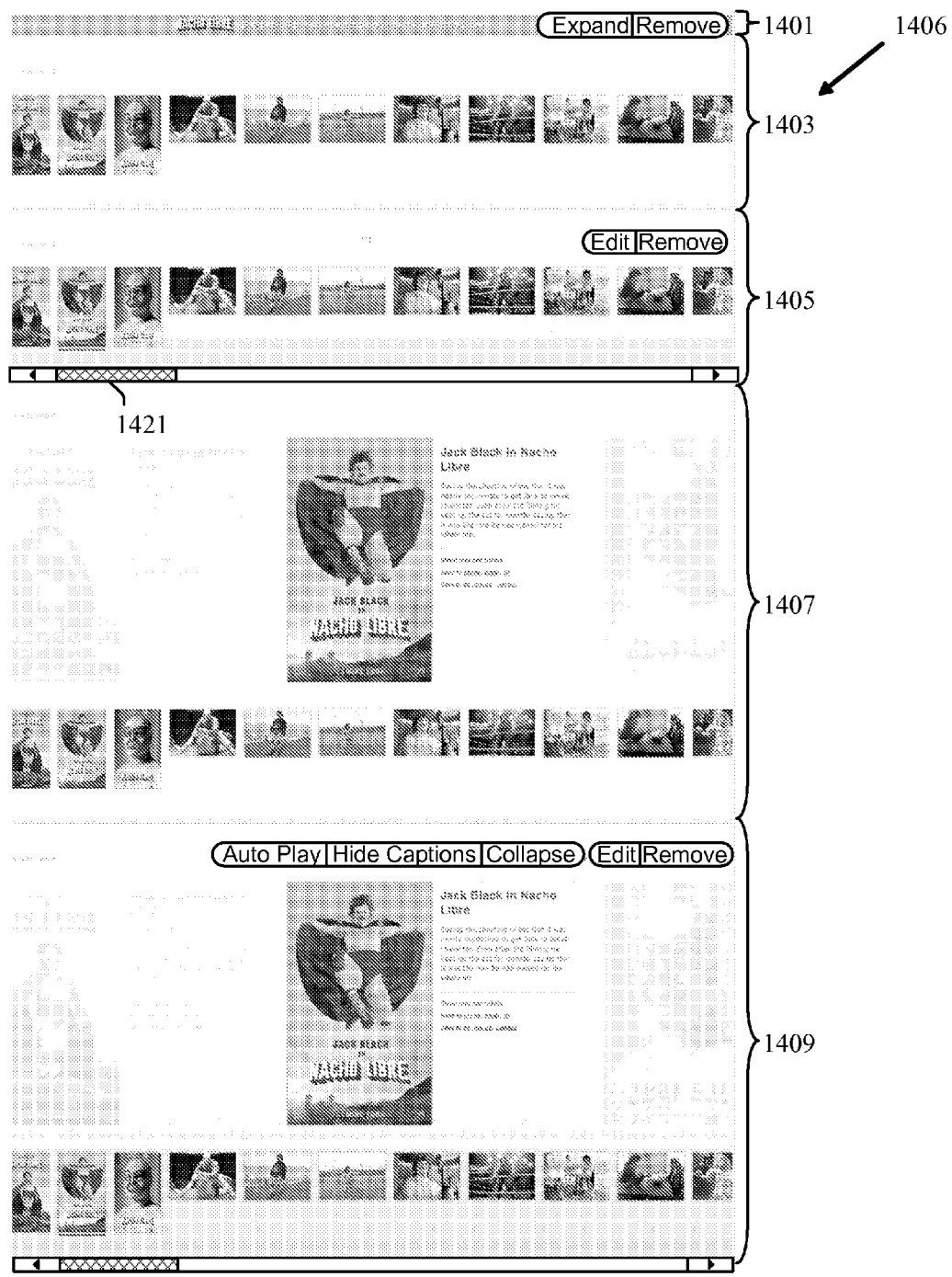
FIG. 14 illustrates an advertisement module related to a movie.

Accordingly, FIG. 14 illustrates an ad module 1406 in various states for the movie Nacho Libre. In the announcement bar state 1401, the user is presented with an invitation to obtain more detail regarding the movie. Clicking the announcement bar 1401 presents the user with a collapsed unrolled state 1403 that presents more information to the user. If the user has still further interest, in the presented content, then the module 1406 transitions to the collapsed rolled state 1405, by positioning a cursor over the module 1406. As described above, the rolled state reveals additional content and/or tools such as a slider 1421. Also mentioned above, a large amount of information is advantageously presented by using horizontal scrolling. For instance, some embodiments include image previews, teaser trailer clips, and/or other information to entice or appease the user's interest.

Moreover, by selecting and/or clicking an item of content in the collapsed state 1405, embodiments of the invention preferably switch to an expanded state 1407 and 1409 to present even further information to the user. Preferably, the ad module 1406 is temporarily removable and/or hidden by the user, but is not otherwise modified by the user.

Figure 15:
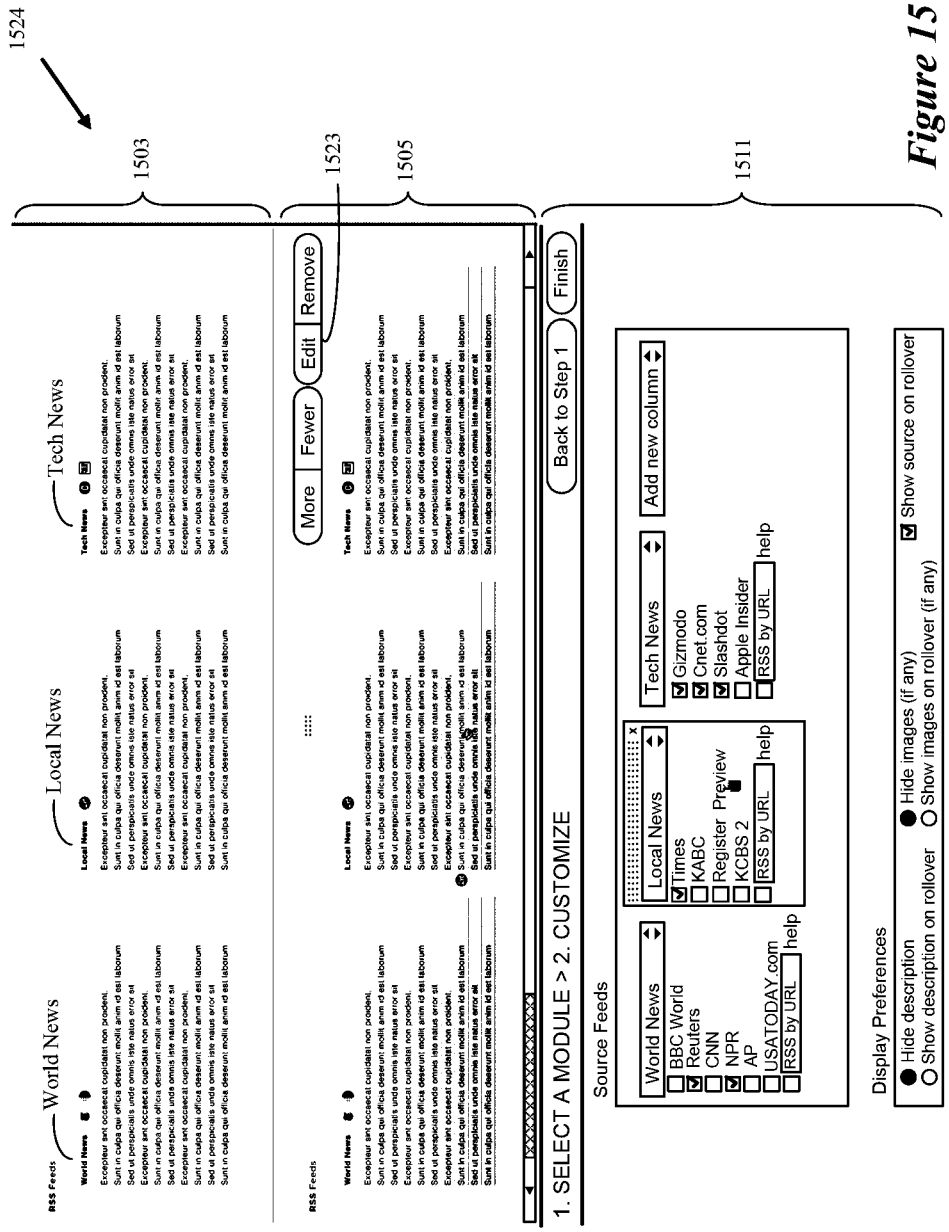
FIG. 15 illustrates a news module.

FIG. 15 illustrates a news module 1524 in a collapsed unrolled state 1503, a collapsed rolled state 1505, and in a customization state 1511. Conventionally, news sites are not customizable. However, particular embodiments repurpose content from one or more news sources, and enable customization features for the user. Accordingly, when a user clicks an edit button 1523, the user is presented with the customization state 1511. In the customization state 1511, the user is enabled to select from a variety of news feeds including world, local, tech, and other news feeds. Moreover, the user is presented with a variety of tools for adjusting the display preferences for the selected news feeds.

FIG. 16 illustrates a daily quote module 1604 in various states, including a collapsed unrolled state 1603, a collapsed rolled state 1605, an expanded rolled state 1609, and customization states 1611 and 1613. When the quote is very long, a portion of the long quote is preferably displayed in the collapsed states 1603 and 1605. Then, when the user indicates a desire to view the full quote, the module 1604 transitions to an expanded state 1609, where the full quote is displayed. Further, the rolled states 1605 and 1609 provide tool buttons such as edit 1623 for customizing the module, remove 1625 for removing the module, and find 1627 for finding specific content, and a slider 1621 navigation tool for viewing additional content. When the find button 1627 is clicked, a search bar 1631 appears. In the illustrated implementation, the search bar 1631 is organized by year and month, and includes a field for entering search criteria. The edit button 1623 transitions the module 1604 to the customization states 1611 and 1613, where a user specifies source and/or display preferences.

Figure 17:
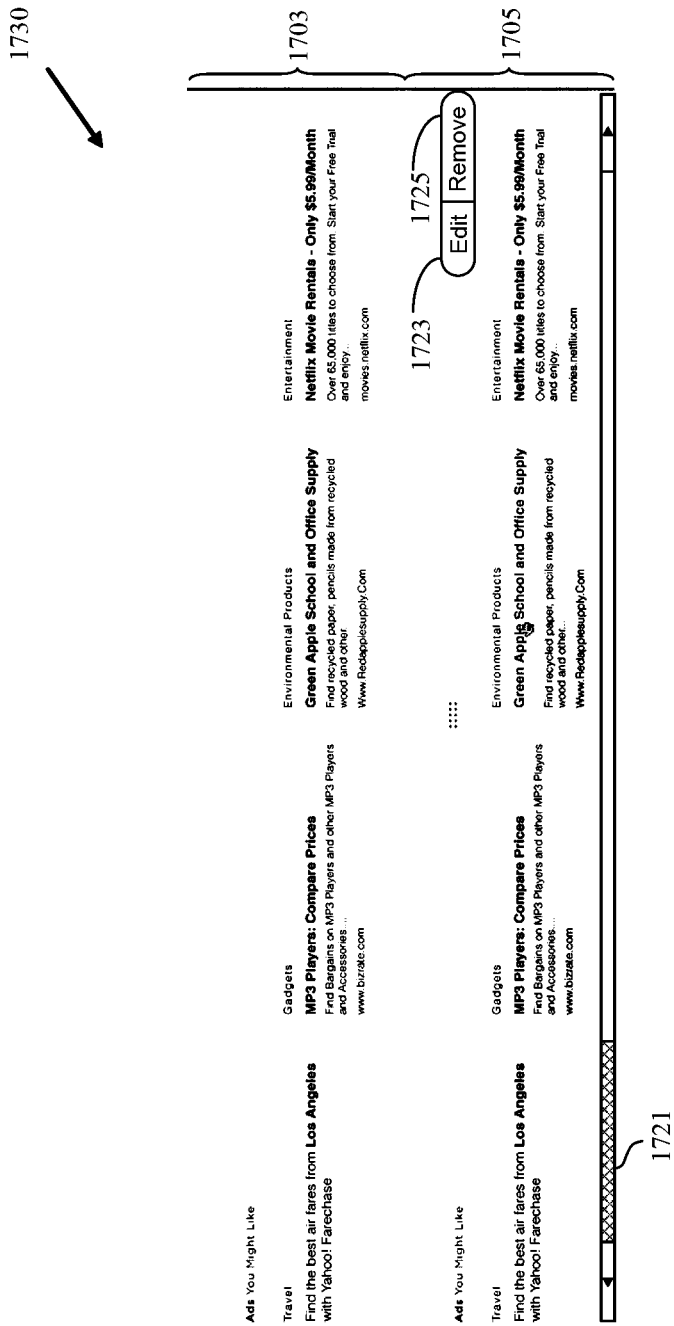
FIG. 17 illustrates an advertising module with targeted ads.

FIG. 17 illustrates a text advertising module 1730 with targeted ads in a collapsed unrolled state 1703 and a collapsed rolled state 1705. As shown in this figure, the rolled state 1705 further presents a slider 1721, an edit button 1723, and a remove button 1725 to the user. In the illustrated embodiment, the module 1730 suggests content in the form of advertising for which the user might have an interest. Some embodiments market to the user in this less obtrusive and suggestive manner, so that the user is not burdened and/or repulsed.

Figure 18:
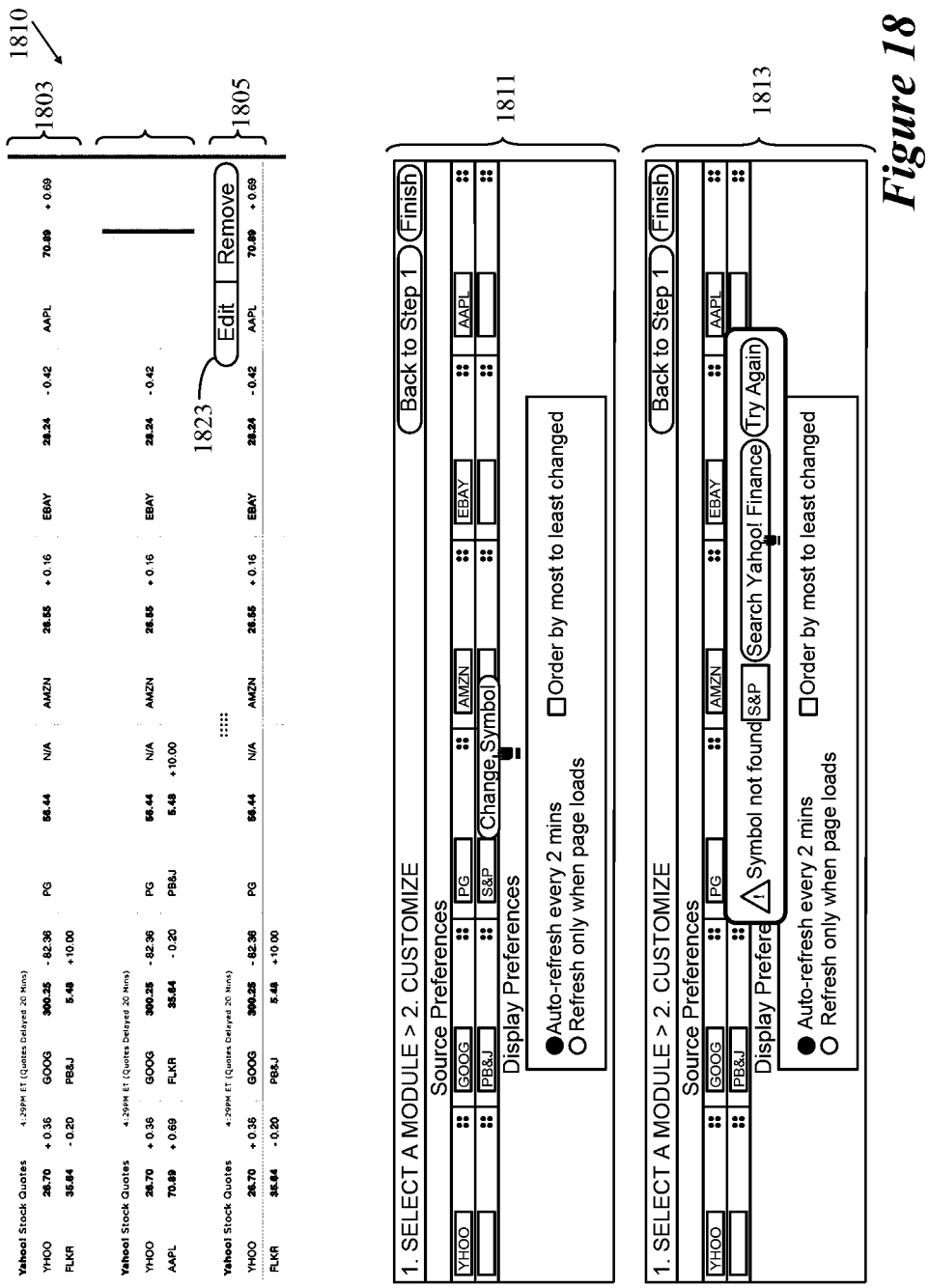
FIG. 18 illustrates a stock module.

FIG. 18 illustrates a stock module 1810 in a collapsed unrolled state 1803, a collapsed rolled state 1805, and configuration states 1811 and 1813. The stock module 1810 presents stocks, prices, and updates at periodic intervals. The module 1810 presents the information for any number of stocks, without the need for navigation to additional pages. An edit button 1823 of the rolled over state 1805, invokes the customization state 1811. The customization state 1811 is for editing the source and display preferences of the module 1810 such as the stocks presented and the refresh rate, for example. As shown in the state 1813, some embodiments assist the user in finding stock exchange symbols when adding new stocks to the module 1810.

Figure 19:
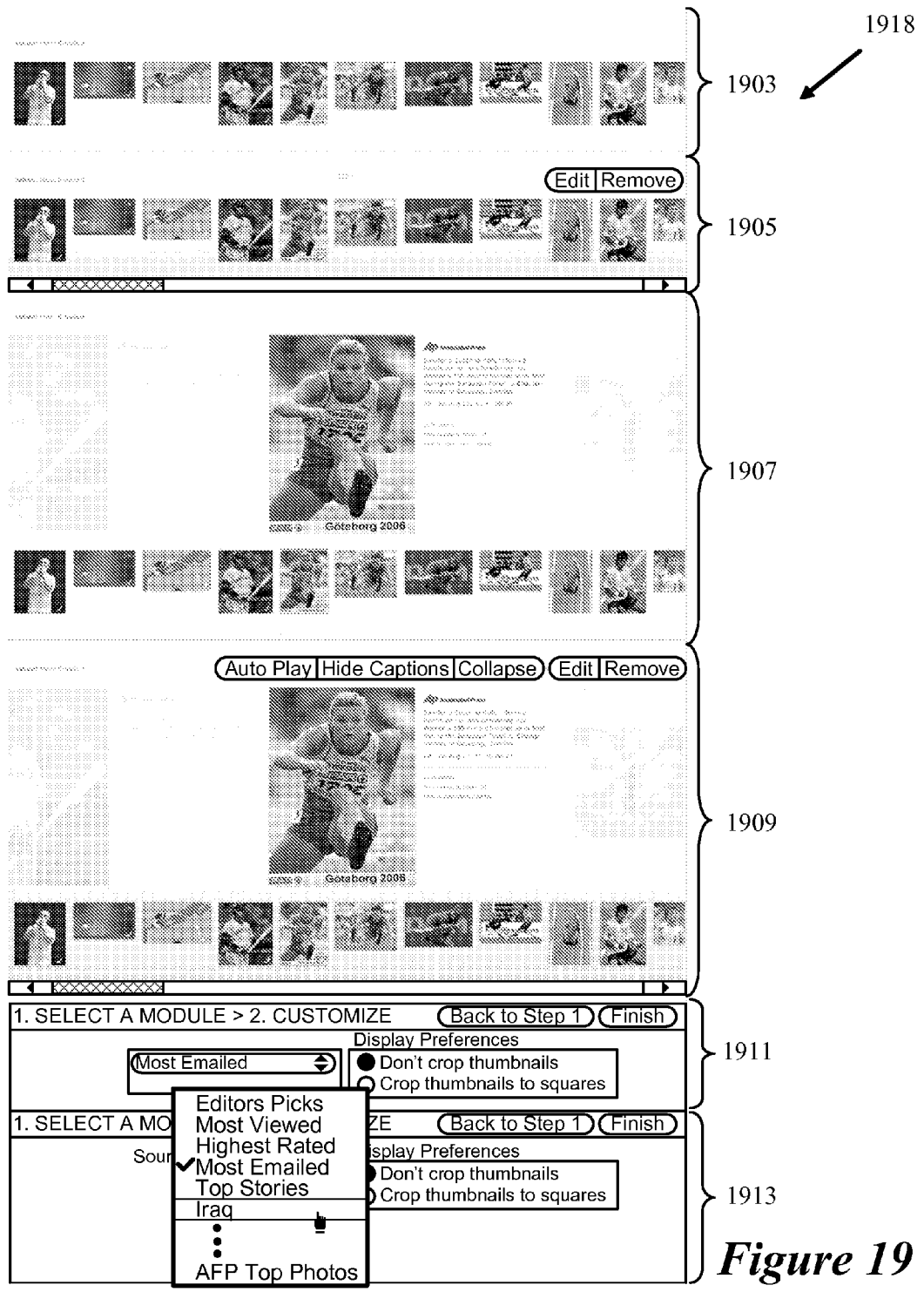
FIG. 19 illustrates a popularity type module.

FIG. 19 illustrates a popularity type module 1918 in various states including a collapsed unrolled state 1903, a collapsed rolled state 1905, an expanded unrolled state 1907, an expanded rolled state 1909, and customization states 1911 and 1913. As described above, each state transitions to the next based on user behavior and/or interest. In the illustrated embodiment, the popularity module 1918 presents news items based on a popularity or user interest score. For instance, the collapsed states 1903 and 1905 present thumbnails, while the expanded states 1907 and 1909 present detailed images and/or captions. The customization states 1911 are activated by using a tool button within the rolled over states 1905 and 1909. In the customization state 1911, a user specifies preferences for source and/or display. The customization state 1913 indicates that the sources of an embodiment include editors picks, most viewed, highest rated, most emailed, top stories, Iraq, entertainment, sports, lifestyle, politics, business, technology, science, health, odd news, and/or AFP top photos. One of ordinary skill recognizes additional sources, and/or alternative items of content based on a scoring system.

Header

Figure 20:
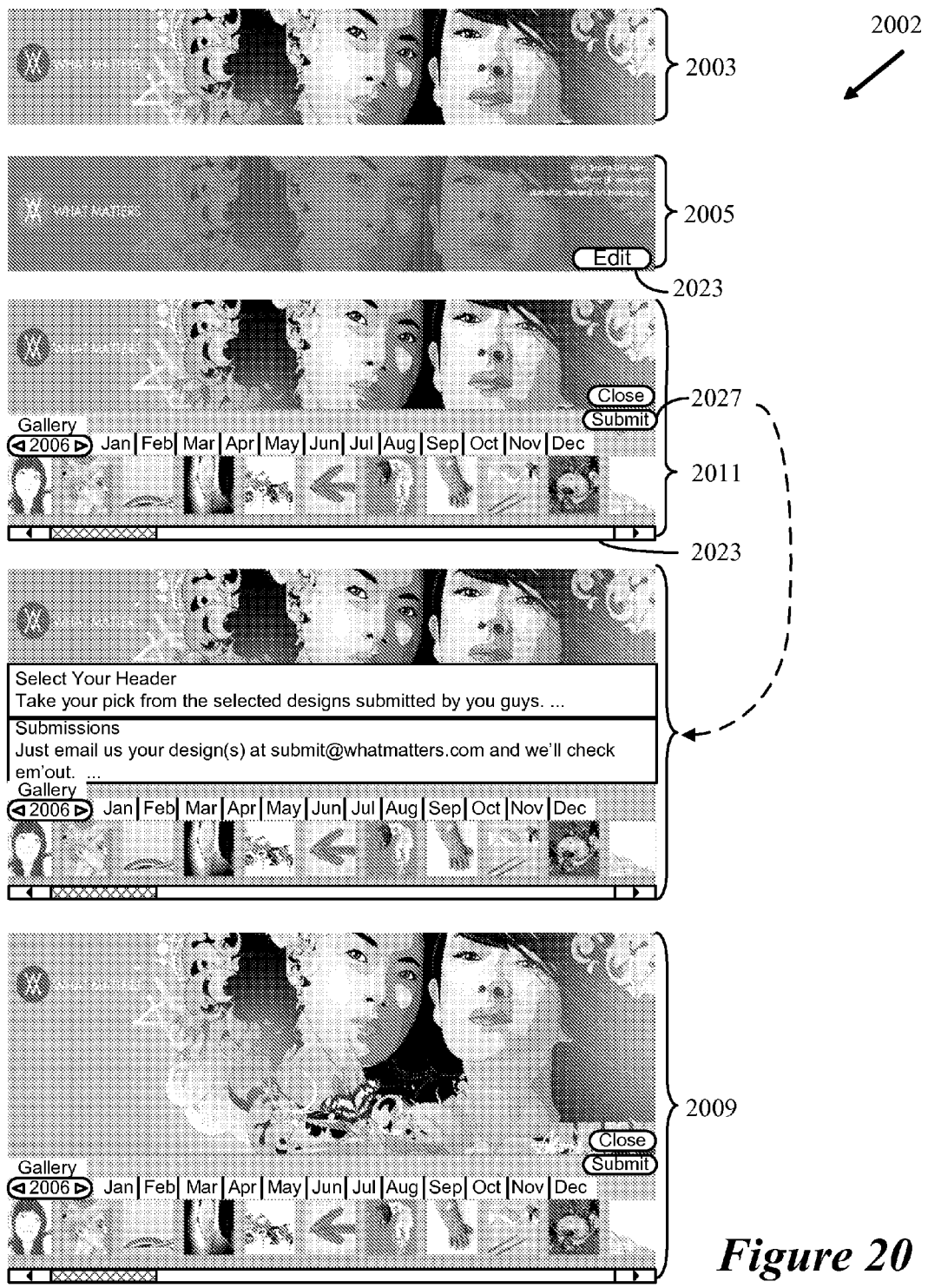
FIG. 20 illustrates a header module.
Figure 21:
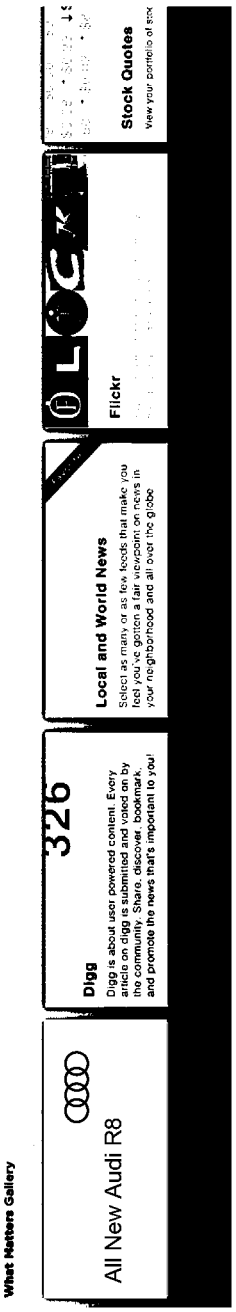
FIG. 21 illustrates a gallery module.

FIG. 20 illustrates a header module 2002 according to an implementation. As shown in this figure the header 2002 has a collapsed state 2003, a collapsed rolled over state 2005, an expanded state 2009, and a customization state 2011.

The collapsed state 2003 advantageously has a slim footprint and reduced information such as reduced content, prompts, buttons, sliders, and/or other navigation tools. Preferably, certain additional content and/or tools are revealed in the rolled over state. As mentioned above, the rolled over state 2005 is achieved when a cursor, which is represented by the pointing hand, is positioned over an unrolled state. In the collapsed rolled state 2005, additional information is presented to the user such as a credit for the art work of the module 2002, and an option to edit the header module 2002.

When clicked, the edit button 2023 opens a customization mode for the header 2002. In one implementation, a tray drops down that provides a variety of templates and/or art work for selection by the user. The tray includes a slider 2001 for the horizontal access of additional templates. In this figure, the templates are organized such as by the month and year of the most selected headers during that time period. However, one of ordinary skill recognizes alternative organizational schemes such as by month and year of submission or creation, for example. The expanded state 2009 shows the content, such as the artwork, in additional detail. In the illustrated state 2009, the module 2002 and image content is shown in a larger format.

Some embodiments provide a default header for new users and/or users who do not select a particular header. For instance, some of these embodiments use as the default the most popular header from the community for the current month and year. In contrast to conventional pages that limit the user to rigid headers for particular brand advertising, some embodiments permit more customizable headers that are more pertinent to the user. In some of these embodiments, the user is able to submit new and/or original templates and artwork by using a submit button 2027. Optionally, the submit button 2027 reveals additional content in the form of a message to the user. Submitted headers are stored in the drop down tray for use by the user and other users. Some headers are sorted and/or stored in particular ways, such as by a rating or voting system as further described below.

Gallery

Particular embodiments include additional modules in a gallery module 2126. The gallery module 2126 stores different types of modules or templates that are selectable by a user for inclusion or addition to the page. The module templates in the gallery 2126 are provided by a host for the customizable web pages such as Yahoo Inc., for example. Alternatively, module templates are submitted and/or vetted by the community for inclusion in the gallery 2126. For instance, the more aesthetic and/or relevant modules preferably receive the most promotion within the gallery module 2126. Some implementations use a rating system. Moreover, developers and designers are able to locate each other through the gallery module 2126. For instance, those users interested in the World of Warcraft game, can create a chat module for chatting with other Warcraft gamers, and submit the module to the gallery module 2126. Such a community based system is contemplated for the headers and artwork of the header tray described above in relation to FIG. 20.

Adding Modules

Figure 22:
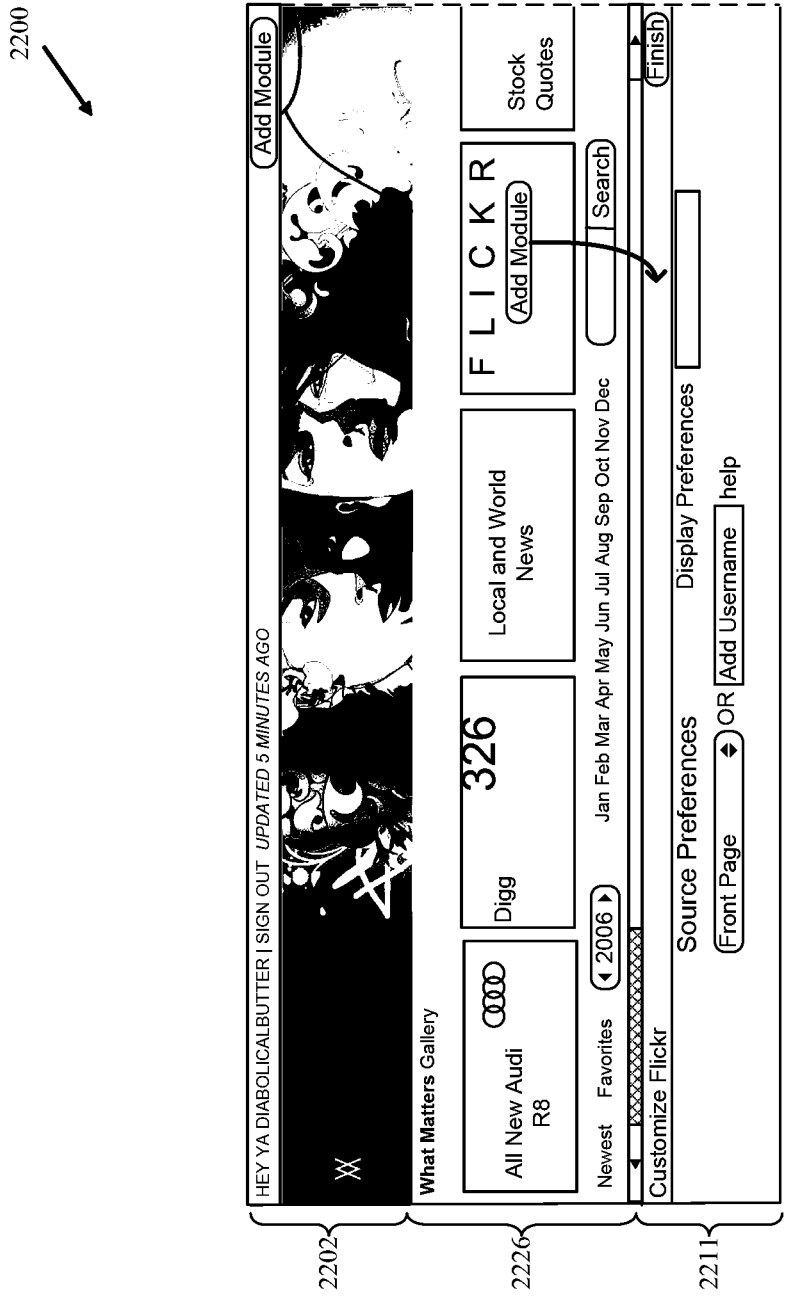
FIG. 22 illustrates adding a module from the header.

FIG. 22 illustrates a variety of ways in which modules are added. As shown in this figure, the header 2202 preferably includes a button for adding a module to a page. When the add module button is clicked, the gallery module 2226 appears to allow the user to select a module from a variety of module templates stored in the gallery. The gallery module 2226 appears in a variety of advantageous ways such as by drop down. Alternatively, the user is transitioned to the gallery within the page. When the user selects a module template from the gallery 2226, the modules in the page preferably slide down to make room for the added module, which appears in a variety of ways in the newly created space on the page. In a particular implementation, the user clicks on the desired module template in the gallery 2226 and/or drags the desired template out of the gallery 2226. In this implementation, the newly added module appears in the desired position by defaulting to a customization state 2211.

Figure 23:
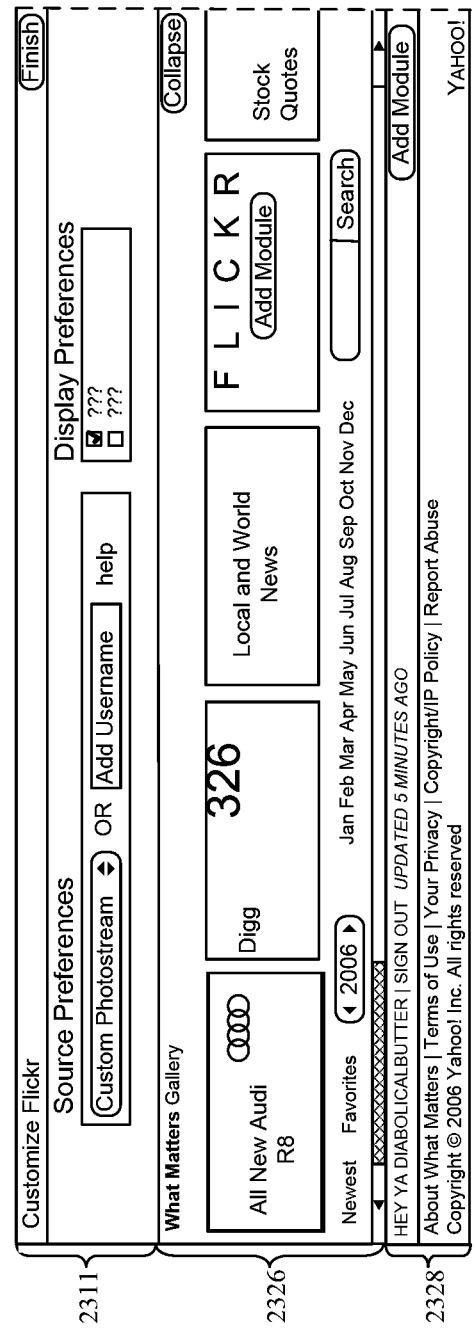
FIG. 23 illustrates adding a module from the footer.

FIG. 23 illustrates an alternative method of adding a module. As shown in this figure, the cursor is near the footer 2328 of the page, and the user enters the gallery module 2326 directly to add a module to the page based on a template stored in the gallery 2326. In this embodiment, the modules in the page slide upward to allow space for the new module, which preferably appears above the gallery module 2326, and in a state 2311 ready for user customization.

Additional Modules and States

As mentioned above, one of ordinary skill recognizes a variety of advantageous module implementations and features. In particular, advertising and other modules include four states for increasing and/or reducing the presentation of the content and/or tools to the user. These four states includes rolled and unrolled over states for each of a collapsed state and an expanded state. Moreover, some embodiments include two additional states for improving usability and customization. The announcement bar state further provides content and/or options for additional content in a space saving and unobtrusive manner. The temporary hide or remove state similarly allows for customization and unobtrusiveness. These and additional features are discussed in relation to the advertising implementations of FIGS. 7-8; 13-14 and 15. Some embodiments include a search feature as part of a module, or alternatively, as a separate search module. The search feature of these embodiments optionally includes an autocomplete function and advantageously provides results in page and/or inline with the user's interaction with the various content and the various modules on the page. This and other features are provided fluidly without the need for additional navigation or window switching. Further, the search feature preferably provides a set of sponsored results that are optionally implemented with the provision of related content and/or advertising.

As mentioned above, additional modules are implemented in alternative embodiments. For instance, a "my newest" module includes content compiled from a variety of sources, based on novelty, while an answers and/or information module includes statistics and/or newly posted answers to a question that is relevant to the user. Alternatively a traffic module presents information in the form of traffic conditions that are user customized such as the traffic for the user's home to work and vice versa. Similarly, a weather module presents a customized user interface that includes a variety of media including maps, audio, video, charts, tables, and other information within the module. Embodiments of the invention include content retrieved from partner site locations, such as watched items provided by eBay Inc., a desktop or schedule provided TiVo Inc., or a short message service (SMS) module for sending and/or receiving messages.

Some embodiments emphasize a community aspect. For instance, an astrology module provides periodic information regarding events and predictions related to astrological signs, and also provides for contributions and sharing among users of the module. Additional modules are recognized by one of ordinary skill in the art. Moreover, despite the quantity and variation of content and modules, the modules present an easy to perceive format on a single self updating page, without the need for additional external navigation.

Additional module possibilities include a map module, an instant messaging module, and an email module. Within each module, content preferences are designated by the user. Also, content is alternatively pushed based on user behavior and/or patterns.

FIG. 2400 illustrates a process 2400 for using the modules of some embodiments. As shown in this figure, the process 2400 begins at the step 2410, where a browser is used to connect to a server. Some embodiments check for specific components such as, for example, one or more cookies, plugins, controls, and/or players. For instance, some embodiments check for a Flash player that is provided by Macromedia Inc. Particular implementations further register an identity for the user and/or for the machine used to connect to the server. The identity includes a user login, and/or a cookie, for example.

Then, at the step 2420 one or more default modules are provided to a new user. The default modules are typically part of a theme. The theme is optionally selected a variety of ways such as by using the user's profile, by user selection, randomly, and/or by another method. Alternatively, if the user and/or the machine is recognized and has previously saved modules, then the saved modules are retrieved and provided to user's browser. After the modules are provided at the step 2420, the process 2400 transitions to the step 2430, where the modules provided at the step 2420 are customized. In some embodiments, the modules are customized by using the editing functions described above. New or unsophisticated users may forego significant or any customization and proceed with one or more default settings and/or default modules.

After zero, one or more modules and/or themes are customized at the step 2430, the process 2400 transitions to the step 2440, where an option to save is presented. If the customizations should be saved, then the process 2400 transitions to the step 2450, where the changes are written to a storage location. Some embodiments save the customization as part of a user profile. The profile is identified by using a unique identifier such as a login ID or by using a cookie for a browser application on a certain machine. Thus, when the user or machine logs in, the saved customizations are retrieved from the storage location for presentation. After the step 2440, the process 2400 transitions to the step 2460.

If the customizations should not be saved at the step 2450, then the process 2400 transitions to the step 2460, where the modules execute a variety of predefined functions. If the modules are customized, some of the execution is based on the customization.

For instance, news modules typically request a response from one or more RSS feeds. Social bookmarking modules might execute javascript object notation (JSON), such as, for example, to interface with an external site dedicated to such bookmarking such as de.licio.us, for example. Photo modules preferably interface with an external site for photographs by using the REST API. The web site flickr.com is an example of such an external photo site. Additional modules, such as movie modules and/or instant messaging modules, for example, optionally use another API and/or protocol to obtain and/or update content for these various different modules.

Regardless of the particular modules and/or execution, at the step 2470 the process 2400 determines whether to edit the default and/or customized modules. For instance, embodiments of the invention alter the parameters of one or more modules. The editing is typically in response to a user request, or alternatively, a system request. If editing should occur at the step 2470, then the process 2400 returns to the step 2430. Otherwise, the process 2400 concludes.

FIG. 25 illustrates a reordering process 2500. The reordering process 2500 is optionally is used to reorder one or more modules within a page, such as the reordering illustrated by FIG. 10, for example. As shown in this figure, the process 2500 begins at the step 2510, where a cursor is positioned or is rolled over a module among a page of modules. Preferably, at the step 2510, one or more buttons are revealed that are for editing, adding, removing, and/or reordering the page. Then, the process 2510 transitions to the step 2520, where a selection for editing and/or customization is made. Once the selection for editing is made, the page zooms out to present a full page view, at the step 2530. From the full page view, one or more modules are selected and/or reordered. In some embodiments, the reordering is performed by using the cursor in a drag-and-drop operation. Further, some embodiments provide visual cues in the form of icons that illustrate the possible directions of movement of each module for reordering. At the step 2550, it is determined whether the process 2500 should continue such as for multiple modules of a page, for example. If the process 2500 should continue at the step 2550, then the process 2500 returns to the step 2540. Otherwise, the reordering process 2500 concludes.

Figure 26:
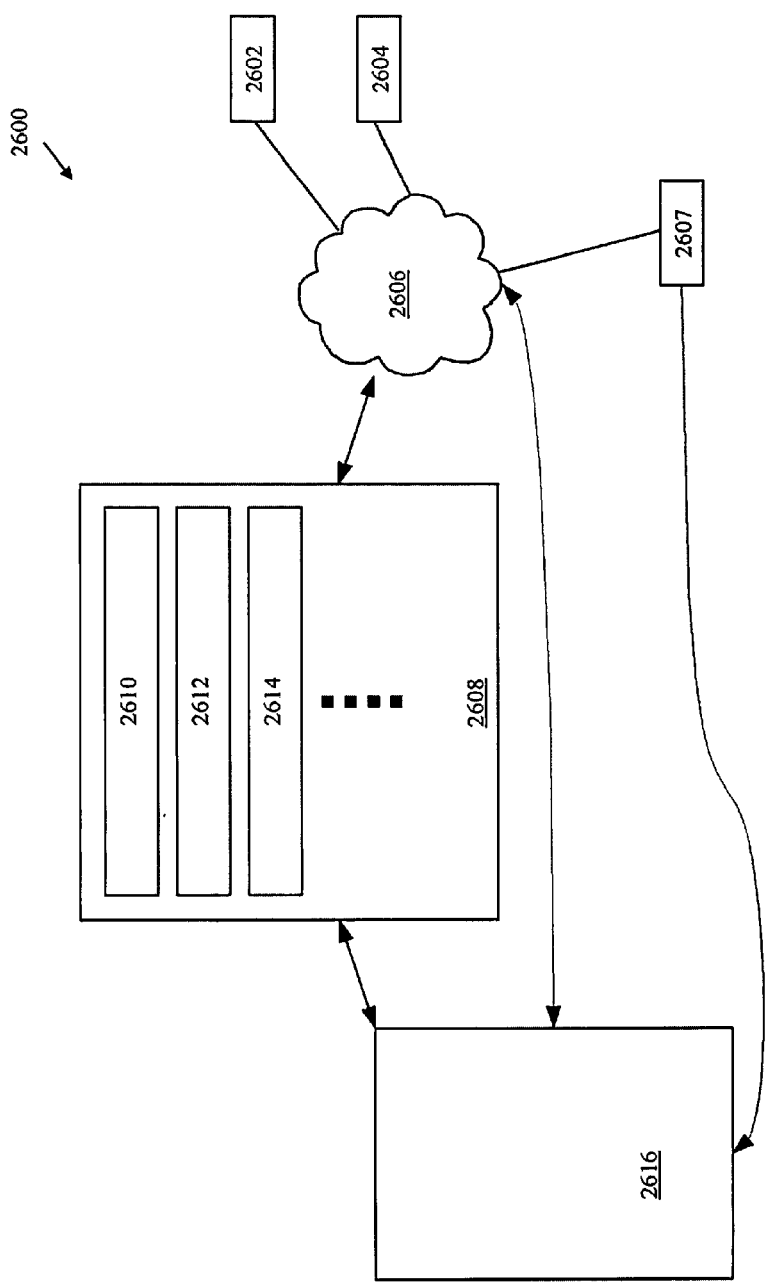
FIG. 26 illustrates a system according to some embodiments.

FIG. 26 illustrates a system 2600 for presenting content including user customizable modules to users through a network. As shown in this figure, the system 2600 includes a plurality of users 2602 and 2604 who interact with a network 2606. The network includes local area networks, wide area networks, and networks of networks such as the Internet, for example. The network 2606 typically includes several sites comprising a number of web pages having content. One or more particular web pages include modules as described above. The modules are for the presentation of content to the users 2602 and 2604. Accordingly, the network 2606 is coupled to an exemplary site or page 2608 that includes several exemplary modules 2610, 2612 and 2614. As represented by the dashed lines, the page 2608 includes a variable number of modules, and one of ordinary skill recognizes that the modules 2610, 2612, and 2614 are merely exemplary in number. The site 2608 is coupled to a server 2616 for providing configuration, storage, retrieval, data collection and/or processing. The server 2616 receives data from a variety of sources, including directly from the users 2602 and 2604, from the network 2606, from the site or page 2608, and/or from another source 2607. Typically, the page 2608 and the server 2616 are provided by one or more of a publisher, a network portal and/or an Internet portal. Further, as the users 2602 and 2604 interact with the network 2606, and the page 2608, content selected and/or configured for the modules, of the page 2608, is presented to the users 2602 and 2604.

Advantages

As a user interface, embodiments of the invention include a personalized home page that has advantages over the art. Some implementations repackage content and data types from one or more locations, including external websites, to create a highly relevant and quality default experience with genuinely useful customization and content options. For instance, implementations of the user interface provide several functionalities over the art. One such functionality includes customizable modules, while another functionality includes horizontal scrolling within a module. Moreover, the length of vertical and/or horizontal scrolling is adjustable, and hence, the amount of content presented is readily and/or automatically customized and updated.

As a system level implementation, embodiments of the invention operate as a traffic driver for audiences that may not otherwise use a web portal and/or certain content nested therein. These embodiments serve as a vehicle for product awareness without overt heavy handed preaching and selling tactics. In this manner, the number of products consumed by users of a content provider and/or a portal are increased.

Embodiments of the invention have advantageous features for those interested in design and technology, among others. Such users tend to already use individual sites for some of the content described above such as, for example, users of social content, social bookmarking, and/or photo web sites, or more specifically, users of digg.com, del.icio.us, and/or flickr.com. Some embodiments include a home page for a group of users that is preferably visited very often for obtaining highly relevant and/or updated content. These embodiments are advantageously designed with default content that is both aggregated and editorial. The default content is often good enough that it does not require elaborate customization. Hence, the content of some embodiments includes items that are appropriate at various times during a user interaction session, particularly when the user or a group of users opens a browser. Some embodiments segment audiences to provide more targeted content and interaction models as well as appropriate advertisers.

By repurposing and/or repackaging existing content via RSS and APIs in more compelling user interface modules, embodiments of the invention surface content to a user who is otherwise unaware of such interesting content. Preferably, these users are launched into novel parts of a site that the users have not experienced. Moreover, the user interface of some embodiments allows users to experience an Internet portal, such as the portal site provided by Yahoo Inc., as a content source in an environment with which the user is more comfortable, without the need for external navigation. Moreover, a variety of content types and quantities is delivered to the user in a single simple and intuitive user interface.

Conventional systems undesirably require users to close and move portions of and within a user interface. To counter the limitations of traditional online advertising models, embodiments employ one or more of the following monetization means, on a highly customizable and user friendly page.

Some implementations, in addition to the advertising, targeting, and marketing implementations described above, perform product promotion by using a specific module entitled "Things We Like" that preferably contains cool, fun, and/or design-oriented products. These products are preferably available through the portal, such as through Yahoo Shopping, for example. Thus, clicking the products presented by this module passes the user through Yahoo Shopping, and carries a purchase referral.

Some implementations include custom advertising tools, and/or modules developed for specific advertisers that have relevant content to showcase. For instance, an automobile manufacturer such as Audi chooses this module implementation to present a design process. As another example, a movie studio customizes a module by using a CGI process. The custom module relates to a particular movie that is being released. Advantageously, new modules are created to showcase content based on an existing module template, such as a Flickr photo module template, for example, or a completely new module that is similar to the Spotlight framework, as another example.

Some implementations include tools for developing and/or customizing a module and/or template. For instance, an advertiser has product information or services that are appropriate for presentation to a user in a module format. Hence, some embodiments include tools for developing sponsored modules. For example, a Netflix movie module advantageously contains new release movie information and trailers. FIG. 13 illustrates an example of a Netflix module 1320.

Community

Some embodiments foster a community aspect. For instance, the inclusion of new modules and types of modules is optionally community driven. In these embodiments, users generate modules and submit the generated modules to the community. Only those modules approved or voted for inclusion by the community are added to the gallery of available modules. The headers of some embodiments are similarly included by using such a rating, voting, or other community oriented system. The spotlight module of particular implementations is another example of a community oriented approach.

While the invention has been described with reference to numerous specific details, one of ordinary skill in the art will recognize that the invention can be embodied in other specific forms without departing from the spirit of the invention. For instance, the examples given above often relate to news, photo, movie, and/or online media, however, additional and/or multiple media types are contemplated as well. Thus, one of ordinary skill in the art would understand that the invention is not to be limited by the foregoing illustrative details, but rather is to be defined by the appended claims.

What is claimed is:

1. A system, comprising at least one processor and memory, for providing content to a user, the system comprising:

a module configured to receive content from a first source and to receive content from a second source;

a module configured to display a first module and a second module from a single webpage, the first module comprising the content from the first source and the second module comprising the content from the second source, the first module and the second module being independent such that the user may interact with the content in the first module independent of the second module, and the user may interact with the content in the second module independent of the first module, each of the first and second module comprising a user customization state for changing the content of the module; and a module configured to display an advertisement module from the single webpage, the advertisement module comprising an advertisement based on the user's interaction with the content of one of the first and second modules;

wherein the advertisement module is configured to:
receive instructions from the user to place the advertisement module in a temporary remove state to remove the advertisement module from the single webpage for a predetermined amount of time;
place the advertisement module in the temporary remove state and remove the advertisement module from the single webpage in response to the instructions received from the user; and
the predetermined amount of time after receiving the instructions from the user, automatically insert the advertisement module within the single web page.

2. The system of claim 1, wherein the user's interaction with the content comprises a click within the content.

3. The system of claim 1, wherein the user's interaction with the content comprises a mouse over event.

4. The system of claim 1, wherein the removal of the advertisement module from the single webpage presents to the user an option for the advertisement module to reappear on the single web page.

5. The system of claim 1, wherein the advertisement module does not comprise a user customization state.

6. The system of claim 1, wherein the first and second modules further comprise an announcement bar state for displaying a portion of the content, the announcement bar state allowing the display of the module to be expanded to display additional portions of the content.

7. The system of claim 1, wherein the user's interactions with the single page are recorded as a plurality of granular events.

8. The system of claim 7, wherein the granular events further comprise the user's interaction with the content of the first and second modules.

9. The system of claim 8, wherein the advertisement comprised within the advertisement module is further based on the user's recorded granular events.

10. The system of claim 1, wherein the first module, second module, and advertisement module comprise equal widths, each of the modules placed in a column.

11. A computer-implemented method of providing content to a user, the method comprising:
in system comprising at least one processor and memory, the at least one processor:
displaying, on a computer, a first module and a second module from a single webpage, the first module comprising content from a first source, the second module comprising content from a second source, wherein the first and second modules comprise a user customization state for changing the content of the module; and
displaying, on a computer, an advertisement module from the single webpage, the advertisement module comprising an advertisement based on the user's interaction with the first and second module of the single web page,
receiving instructions from the user to place the advertisement module in a the temporary remove state to remove the advertisement module from the single webpage for a predetermined amount of time;
placing the advertisement module in the temporary remove state and removing the advertisement module from the single webpage in response to the instructions received from the user; and
the predetermined amount of time after receiving the instructions from the user, automatically displaying the advertisement module within the single web page.

12. The computer-implemented method of claim 11, wherein the user's interaction with the single web page comprises a click within the modules.

13. The computer-implemented method of claim 11, wherein the user's interaction with the single web page comprises a mouse over event.

14. The computer-implemented method of claim 11, further comprising:
presenting to the user an option for the advertisement module to reappear on the single web page while the advertisement module is removed from the single webpage.

15. The computer-implemented method of claim 11, wherein the advertisement module does not comprise a user customization state.

16. The computer-implemented method of claim 11, wherein the first and second modules further comprise an announcement bar state for displaying a portion of the content, the announcement bar state allowing the display of the module to be expanded to display additional portions of the content.

17. The computer-implemented method of claim 11, wherein the user's interactions with the single page are recorded as a plurality of granular events.

18. The computer-implemented method of claim 17, wherein the granular events comprise the user's interaction with the content of the first and second modules.

19. The computer-implemented method of claim 18, wherein the advertisement comprised within the advertisement module is further based on the user's recorded granular events.

20. The computer-implemented method of claim 11, wherein the first module, second module, and advertisement module comprise equal widths, each of the modules placed in a column.

21. A computer-implemented method of providing content to a user, the method comprising:
in system comprising at least one processor and memory, the at least one processor:
receiving content from a first source and content from a second source;
displaying a first module and a second module from a single webpage, the first module comprising the content from the first source and the second module comprising the content from the second source, the first module and the second module being independent such that the user may interact with the content in the first module independent of the second module, and the user may interact with the content in the second module independent of the first module, each of the first and second module comprising a user customization state for changing the content of the module;
displaying an advertisement module from the single webpage, the advertisement module comprising an advertisement based on the user's interaction with the content of at least one of the first and second modules;
receiving instructions from the user to place the advertisement module in a temporary remove state to remove the advertisement module from the single webpage for a predetermined amount of time;
placing the advertisement module in the temporary remove state and remove the advertisement module from the single webpage in response to the instructions received from the user; and the predetermined amount of time after receiving the instructions from the user, automatically inserting the advertisement module within the single web page.

22. The computer-implemented method of claim 21, wherein the user's interaction with the content comprises a click within the content.

23. The computer-implemented method of claim 21, wherein the user's interaction with the content comprises a mouse over event.

24. The computer-implemented method of claim 21, further comprising:

presenting the user an option for the advertisement module to reappear on the single webpage while the advertisement module is removed from the single webpage.

25. The computer-implemented method of claim 21, wherein the advertisement module does not comprise a user customization state.

26. The computer-implemented method of claim 21, wherein the first and second modules further comprise an announcement bar state for displaying a portion of the content, the announcement bar state allowing the display of the module to be expanded to display additional portions of the content.

27. The computer-implemented method of claim 21, wherein the user's interactions with the single page are recorded as a plurality of granular events.

28. The computer-implemented method of claim 27, wherein the granular events further comprise the user's interaction with the content of the first and second modules.

29. The computer-implemented method of claim 28, wherein the advertisement comprised within the advertisement module is further based on the user's recorded granular events.

30. The computer-implemented method of claim 21, wherein the first module, second module, and advertisement module comprise equal widths, each of the modules placed in a column.

31. The computer-implemented method of claim 21, wherein the changing of the content comprises changing the source of the content.

* * * * *